(12) United States Patent
Li et al.

(10) Patent No.: US 10,716,041 B2
(45) Date of Patent: *Jul. 14, 2020

(54) ACCESS NETWORK DEVICE, USER EQUIPMENT, COMMUNICATIONS SYSTEM, AND COMMUNICATION METHOD

(71) Applicant: HUAWEI TECHNOLOGIES CO., LTD., Shenzhen, Guangdong (CN)

(72) Inventors: Qiming Li, Beijing (CN); Jing Han, Beijing (CN); Anjian Li, Beijing (CN); Fankui Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,071

(22) Filed: Dec. 9, 2019

(65) Prior Publication Data

US 2020/0112893 A1  Apr. 9, 2020

Related U.S. Application Data

(63) Continuation of application No. 15/894,272, filed on Feb. 12, 2018, now Pat. No. 10,524,174, which is a
(Continued)

(51) Int. Cl.
*H04W 36/00* (2009.01)
*H04W 28/00* (2009.01)
(Continued)

(52) U.S. Cl.
CPC ....... *H04W 36/0088* (2013.01); *H04W 28/00* (2013.01); *H04W 28/16* (2013.01);
(Continued)

(58) Field of Classification Search
CPC ... H04W 84/005; H04W 80/04; H04W 84/12; H04W 88/10; H04W 40/00; H04W 40/02;
(Continued)

(56) References Cited

U.S. PATENT DOCUMENTS 8,160,075 B2   4/2012   Kazmi et al.
9,801,077 B2  10/2017   Girolamo et al.
(Continued)

FOREIGN PATENT DOCUMENTS

CN    1863385      11/2006
CN  101192878       6/2008
(Continued)

OTHER PUBLICATIONS

Office Action issued in Japanese Application No. 2018-506944 dated Sep. 3, 2019, 6 pages (with English Translation).
(Continued)

*Primary Examiner* — Nimesh Patel
(74) *Attorney, Agent, or Firm* — Fish & Richardson P.C.

(57) ABSTRACT

The present disclosure relates to communication methods and devices. One example access network device includes at least one processor configured to generate requirement indication information. The requirement indication information is used to indicate a radio resource management (RRM) requirement to be satisfied by a user equipment (UE). The RRM requirement is suitable for a high-speed mobile communication environment. The example access network device also includes a transmitter configured to send the requirement indication information to the UE.

14 Claims, 6 Drawing Sheets

Related U.S. Application Data continuation of application No. PCT/CN2015/086896, filed on Aug. 13, 2015.

(51) Int. Cl.

| | | |
|---|---|---|
| *H04W 28/16* | (2009.01) | |
| *H04W 72/04* | (2009.01) | |
| *H04W 76/28* | (2018.01) | |
| *H04W 88/02* | (2009.01) | |
| *H04W 88/08* | (2009.01) | |
| *H04W 36/32* | (2009.01) | |

(52) U.S. Cl.
CPC ......... *H04W 72/042* (2013.01); *H04W 76/28* (2018.02); *H04W 36/0085* (2018.08); *H04W 36/32* (2013.01); *H04W 72/048* (2013.01); *H04W 88/02* (2013.01); *H04W 88/08* (2013.01)

(58) Field of Classification Search
CPC ....... H04W 8/085; H04W 8/12; H04W 48/04; H04W 4/023; H04W 64/00; H04W 16/18; H04W 24/04; H04W 28/0268; H04W 76/28; H04W 36/0083; H04W 36/32; H04W 52/0225; H04W 72/042; H04W 72/04; H04W 36/0033; H04W 36/30; H04W 88/06; H04W 36/0088; H04W 36/0094; H04W 48/12; H04W 28/16; H04W 52/0251; H04W 88/02; H04W 88/08; H04W 8/08; H04W 40/36; H04W 36/0011; H04W 36/0044; H04W 36/165; H04W 28/18; H04W 36/0016; H04W 4/08; H04W 48/10; H04W 68/00; H04W 84/20; H04W 88/16; H04W 88/182; H04L 12/66; H04L 45/48; H04L 67/2861; H04L 47/14; H04L 12/185; H04L 41/0896; H04L 47/10; H04L 47/762; H04L 43/0811; H04L 47/70; H04L 12/5692; H04L 45/02; H04L 47/767; H04L 47/2408; H04L 47/805; H04L 43/0876; H04L 5/0032; H04L 5/0048; H04L 5/006; H04L 1/0042; H04L 5/0057; H04L 5/0069; H04L 47/24; H04L 29/90; H04L 67/322; H04L 12/2801; H04L 12/64; H04L 2012/2841; H04L 2012/2849; H04L 2029/06054; H04L 41/0823; H04L 41/083; H04L 43/04; H04L 47/125; H04L 47/20; H04L 47/25; H04L 47/29; H04L 65/80; H04L 47/1002; H04L 2012/5642; H04L 2012/5651; H04L 41/046; H04L 41/082; H04L 41/0859; H04L 41/145; H04L 47/781; H04L 49/254; Y02D 70/24; Y02D 70/1262; Y02D 70/00; Y02D 70/1242; Y02D 70/1222; Y02D 70/1264; Y02D 70/1244; Y02D 70/1246; Y02D 70/1226; Y02D 70/124; Y02D 70/1224; Y02D 70/142; Y02D 70/144; Y02D 70/22; Y02D 70/30; Y02D 70/38; G06F 11/1458; G06F 11/3409; G06F 11/3442; G06F 12/0871; G06F 12/0897; G06F 15/16; G06F 16/252; G06F 16/353; G06F 16/93; G06F 2009/45587; G06F 3/0604; G06F 3/061; G06N 20/00; G06N 3/02; G06N 3/0445; G06N 3/0454; G06N 3/0472; H04B 3/32; H04B 7/0608; H04B 10/508; H04B 10/27; H04B 17/309; H04B 17/318; H04B 3/60; H04B 7/1858; H04B 7/18591

See application file for complete search history.

(56) References Cited

U.S. PATENT DOCUMENTS

| | | |
|---|---|---|
| 10,524,174 B2 | 12/2019 | Li et al. |
| 2009/0219900 A1 | 9/2009 | Kokkinen |
| 2009/0303891 A1 | 12/2009 | Richard et al. |
| 2010/0074221 A1 | 3/2010 | Hong et al. |
| 2010/0150108 A1 | 6/2010 | Aghvami et al. |
| 2010/0298001 A1 | 11/2010 | Dimou et al. |
| 2011/0124330 A1 | 5/2011 | Kojima |
| 2011/0149906 A1 | 6/2011 | Hong et al. |
| 2012/0270594 A1 | 10/2012 | Parkvall et al. |
| 2013/0188547 A1 | 7/2013 | Tetsuro et al. |
| 2014/0295770 A1 | 10/2014 | Weiwei et al. |
| 2015/0172970 A1 | 6/2015 | Qian et al. |
| 2015/0215830 A1 | 6/2015 | Dalsgaard |
| 2015/0208301 A1 | 7/2015 | Ueda |
| 2016/0345221 A1 | 11/2016 | Axmon et al. |
| 2017/0251417 A1 | 8/2017 | Lin |

FOREIGN PATENT DOCUMENTS

| | | |
|---|---|---|
| CN | 101588625 | 11/2009 |
| CN | 101635991 | 1/2010 |
| CN | 103024879 | 4/2013 |
| CN | 103167551 | 6/2013 |
| EP | 2696625 | 2/2014 |
| JP | 2015520570 | 7/2015 |
| WO | 2011083729 | 7/2011 |
| WO | 2012137293 | 10/2012 |
| WO | 2013114155 | 8/2013 |
| WO | 2013170714 | 11/2013 |
| WO | 2014034090 | 3/2014 |

OTHER PUBLICATIONS

Office Action issued in Chinese Application No. 201580082093.X dated Jul. 25, 2019, 9 pages.
Japanese Office Action issued in Japanese application No. 2018506944 dated Dec. 11, 2018, 15 pages.
3GPP TSG-RAN WG4 Meeting# 75 R4-152851,"Considerations on RRM for high speed train studies", Ericsson, May 25-29, 2015, 4 pages.
3GPP TS 36.133 V13.0.0 (Jul. 2015), 3rd Generation Partnership Project, Technical Specification Group Radio Access Network, Evolved Universal Terrestrial Radio Access (E-UTRA), Requirements for support of radio resource management(Release 13), 1411 pages.
3GPP TSG-RAN WG4 Meeting #75 R4-152926, "Further discussion on RRM requirements for high speed scenarios", Huawei, HiSilicon, May 25-29, 2015, 3 pages.
3GPP TS 36.331 V12.6.0 (Jun. 2015), 3rd Generation Partnership Project, Technical Specification Group Radio Access Network, Evolved Universal Terrestrial Radio Access (E-UTRA), Radio Resource Control (RRC);Protocol specification (Release 12), 449 pages.
International Search Report issued in International Application No. PCT/CN2015/086896 dated May 19, 2016, 7 pages.
Panasonic, "Summary of email discussion on DRX in LTE ACTIVE", 3GPP TSG RAN WG2 #56bis R2-070088, Sorrento, Italy, Jan. 15-19, 2007, 10 pages.
Huawei, "RRM requirements for the existing high speed scenarios", 3GPP TSG-RAN WG4 Meeting #74bis, R4-151710,Rio de Janeiro, Brazil, Apr. 20-24, 2015, 4 pages.
Alcatel Lucent,"Discussion of HST UE RRM Requirements",3GPP TSG-RAN WG4 Meeting #75 R4-152998, Fukuoka, Japan, May 25-29, 2015, 4 pages.
Ericsson, "Considerations on RRM for high speed train studies",3GPP TSG-RAN WG4 Meeting# 75 R4-153660, Fukuoka, Japan, May 25-29, 2015, 4 pages.

(56) References Cited

OTHER PUBLICATIONS

Extended European Search Report issued in European Application No. 15900789.7 dated Jun. 25, 2018, 11 pages.

ACCESS NETWORK DEVICE, USER EQUIPMENT, COMMUNICATIONS SYSTEM, AND COMMUNICATION METHOD

CROSS-REFERENCE TO RELATED APPLICATIONS

This application is a continuation of U.S. patent application Ser. No. 15/894,272, filed on Feb. 12, 2018, which is a continuation of International Application No. PCT/CN2015/086896, filed on Aug. 13, 2015. All of the afore-mentioned patent applications are hereby incorporated by reference in their entireties.

TECHNICAL FIELD

The present application relates to the communications field, and in particular, to an access network device, user equipment, a communications system, and a communication method.

BACKGROUND

With changes of eras and advancement of science and technology, there are increasing vehicles around people, and speeds of the vehicles are becoming higher. Based on actually measured data of communications operators and theoretical analysis of mobile communications in a high-speed environment, mobile communications in a high-speed environment has many problems in comparison with conventional cellular network communications.

In the prior art, if user equipment (UE) in a high-speed moving state (for example, in a high speed train) performs radio resource management such as measurement, cell selection or reselection, handover, and radio link monitoring still by using a radio resource management (RRM) algorithm parameter in an ordinary cellular network, because the UE moves at a quite high speed, a situation shown in FIG. 1 easily occurs. Although the UE passes through a target cell, RRM cannot be well completed.

For example, UE is located in a high speed train (HST) at a speed of 350 km/h, and cells are at intervals of 500 meters. If the UE in an idle state performs cell reselection by using a discontinuous reception (DRX) cycle of 0.32 seconds in an ordinary cellular network, provided that the UE completes identification and evaluation on an intra-frequency cell within 36 DRX cycles (that is, 11.52 seconds), a reselection condition may be satisfied. However, according to a requirement of 11.52 seconds, a maximum distance traveled by the UE may be 1120 meters. Therefore, a case in which the UE has passed through a target cell but still cannot camp on the target cell easily occurs. Consequently, system performance is severely degraded.

How to satisfy an RRM requirement in a high-speed mobile communication environment and ensure and improve network performance is a current research hotspot.

SUMMARY

A technical problem to be resolved in embodiments of the present application is to provide an access network device, user equipment, a communications system, and a communication method, so as to satisfy an RRM requirement that is suitable for a high-speed mobile communication environment, and ensure and improve network performance.

According to a first aspect, an access network device is provided, including:

a processing module, configured to generate requirement indication information, where the requirement indication information is used to indicate that user equipment UE needs to satisfy a radio resource management RRM requirement that is suitable for a high-speed mobile communication environment; and a sending module, configured to send the requirement indication information to the UE within coverage of a cell.

With reference to the first aspect, in a first possible implementation, the sending module is specifically configured to:

send radio resource control RRC dedicated signaling to the UE within the coverage of the cell, where the RRC dedicated signaling carries the requirement indication information; or send a system message to the UE within the coverage of the cell, where the system message carries the requirement indication information.

With reference to the first aspect or the first possible implementation of the first aspect, in a second possible implementation, the requirement indication information includes speed level information, the speed level information is used to indicate a speed level of the high-speed mobile communication environment, and the speed level of the high-speed mobile communication environment is used to enable the UE to determine whether the UE is in the high-speed mobile communication environment.

With reference to the first aspect, the first possible implementation of the first aspect, or the second possible implementation of the first aspect, in a third possible implementation, the requirement indication information includes range information of a high-speed dedicated cell identifier, and the range information of the high-speed dedicated cell identifier is used to indicate the cell located in the high-speed mobile communication environment.

With reference to the first aspect, the first possible implementation of the first aspect, the second possible implementation of the first aspect, or the third possible implementation of the first aspect, in a fourth possible implementation, the access network device further includes:

a receiving module, configured to receive high-speed adjustment capability information reported by the UE, where the processing module is further configured to determine, according to the high-speed adjustment capability information, that the UE has a capability of supporting the RRM requirement that is suitable for the high-speed mobile communication environment, and control the sending module to send the requirement information to the UE.

With reference to the first aspect, the first possible implementation of the first aspect, the second possible implementation of the first aspect, the third possible implementation of the first aspect, or the fourth possible implementation of the first aspect, in a fifth possible implementation, the processing module is further configured to control the sending module to send discontinuous reception cycle indication information to the UE, where the discontinuous reception cycle indication information is used to indicate a discontinuous reception cycle, and the discontinuous reception cycle is less than 0.32 seconds.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation, the processing module is further configured to control the sending module to send time period parameter indication information to the UE, where the time period parameter indication information is used to indicate a time period parameter of a T310 timer, and the time period parameter is greater than 2 seconds.

According to a second aspect, user equipment is provided, including:

a receiving module, configured to receive requirement indication information sent by an access network device, where the requirement indication information is used to indicate that the user equipment needs to satisfy a radio resource management RRM requirement that is suitable for a high-speed mobile communication environment; and a processing module, configured to determine, according to the requirement indication information, that the RRM requirement that is suitable for the high-speed mobile communication environment needs to be satisfied.

With reference to the second aspect, in a first possible implementation, the processing module is further configured to adjust an RRM policy according to a preset RRM parameter suitable for the high-speed mobile communication environment.

With reference to the second aspect or the first possible implementation of the second aspect, in a second possible implementation, the requirement indication information includes speed level information, and the speed level information is used to indicate a speed level of the high-speed mobile communication environment; and the processing module is configured to determine, in the following manner, that the RRM requirement that is suitable for the high-speed mobile communication environment needs to be satisfied:

determining, according to the speed level information, that the RRM requirement that is suitable for the high-speed mobile communication environment is satisfied.

With reference to the second aspect or the first possible implementation of the second aspect, in a third possible implementation, the requirement indication information includes range information of a high-speed dedicated cell identifier, and the range information of the high-speed dedicated cell identifier is used to indicate a cell located in the high-speed mobile communication environment; and the processing module is configured to determine, in the following manner, that the RRM requirement that is suitable for the high-speed mobile communication environment needs to be satisfied: if it is determined that a cell identifier of a currently accessed cell falls within a range of the high-speed dedicated cell identifier, determining that the RRM requirement that is suitable for the high-speed mobile communication environment needs to be satisfied.

With reference to the second aspect, the first possible implementation of the second aspect, the second possible implementation of the second aspect, or the third possible implementation of the second aspect, in a fourth possible implementation, the user equipment further includes:

a sending module, configured to report high-speed adjustment capability information to the access network device, where the high-speed adjustment capability information is used to indicate that the UE has a capability of supporting the RRM requirement that is suitable for the high-speed mobile communication environment.

With reference to the first possible implementation of the second aspect, the second possible implementation of the second aspect, the third possible implementation of the second aspect, or the fourth possible implementation of the second aspect, in a fifth possible implementation, the receiving module is further configured to receive discontinuous reception cycle indication information from the access network device, where the discontinuous reception cycle indication information is used to indicate a discontinuous reception cycle, and the discontinuous reception cycle is less than 0.32 seconds; and the processing module is further configured to perform intra-frequency cell reselection according to the discontinuous reception cycle when the user equipment is in an idle state.

With reference to the first possible implementation of the second aspect, the second possible implementation of the second aspect, the third possible implementation of the second aspect, the fourth possible implementation of the second aspect, or the fifth possible implementation of the second aspect, in a sixth possible implementation, the processing module is further configured to perform intra-frequency cell reselection according to preset evaluation time parameters of a cell reselection process when the user equipment is in the idle state, where among the evaluation time parameters of the cell reselection process, an evaluation time parameter corresponding to a discontinuous reception cycle of 2.56 seconds is less than 7.68 seconds, an evaluation time parameter corresponding to a discontinuous reception cycle of 1.28 seconds is less than 6.4 seconds, an evaluation time parameter corresponding to a discontinuous reception cycle of 0.64 seconds is less than 5.12 seconds, or an evaluation time parameter corresponding to a discontinuous reception cycle of 0.32 seconds is less than 5.12 seconds.

With reference to the first possible implementation of the second aspect, the second possible implementation of the second aspect, the third possible implementation of the second aspect, the fourth possible implementation of the second aspect, the fifth possible implementation of the second aspect, or the sixth possible implementation of the second aspect, in a seventh possible implementation, the processing module is further configured to perform intra-frequency cell reselection according to a preset identification time parameter of the cell reselection process when the user equipment is in the idle state, where the identification time parameter of the cell reselection process is less than 20 discontinuous reception cycles.

With reference to the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, or the seventh possible implementation of the second aspect, in an eighth possible implementation, the processing module is further configured to perform target cell identification according to preset target cell identification time parameters when the user equipment is in a connected state, where among the target cell identification time parameters, a target cell identification time parameter corresponding to a discontinuous reception cycle of 0.04 seconds is less than 0.8 seconds, a target cell identification time parameter corresponding to a discontinuous reception cycle greater than 0.04 seconds and not exceeding 0.08 seconds is less than 40 discontinuous reception cycles, a target cell identification time parameter corresponding to a discontinuous reception cycle of 0.128 seconds is less than 25 discontinuous reception cycles, or a target cell identification time parameter corresponding to a discontinuous reception cycle greater than 0.128 seconds and not exceeding 2.56 seconds is less than 20 discontinuous reception cycles.

With reference to the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, or the eighth possible implementation of the second aspect, in a ninth possible implementation, the processing module is further configured to perform radio link monitoring according to preset in-synchronization/out-of-synchronization evaluation period parameters when the user equipment is in the connected state, where among the in-synchronization/out-of-synchronization evaluation period parameters, an in-synchronization/out-of-synchronization evaluation period parameter corresponding to a discontinuous reception cycle greater than 0.01 second and not exceeding 0.04 seconds is less than 20 discontinuous reception cycles, an in-synchronization/out-of-synchronization evaluation period parameter corresponding to a discontinuous reception cycle greater than 0.04 seconds and not exceeding 0.64 seconds is less than 10 discontinuous reception cycles, or an in-synchronization/out-of-synchronization evaluation period parameter corresponding to a discontinuous reception cycle greater than 0.64 seconds and not exceeding 2.56 seconds is less than five discontinuous reception cycles.

With reference to the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, the eighth possible implementation of the second aspect, or the ninth possible implementation of the second aspect, in a tenth possible implementation, the processing module is further configured to perform measurement reporting according to a preset measurement parameter when the user equipment is in the connected state, where the measurement parameter is less than 200 milliseconds, a measurement parameter corresponding to a discontinuous reception cycle less than or equal to 0.04 seconds is less than 200 milliseconds, or a measurement parameter corresponding to a discontinuous reception cycle greater than 0.04 seconds and less than or equal to 2.56 seconds is less than five discontinuous reception cycles.

With reference to the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, the eighth possible implementation of the second aspect, the ninth possible implementation of the second aspect, or the tenth possible implementation of the second aspect, in an eleventh possible implementation, the receiving module is further configured to receive time period parameter indication information from the access network device, where the time period parameter indication information is used to indicate a time period parameter of a T310 timer, and the time period parameter is greater than 2 seconds; and the processing module is further configured to: when the user equipment is in a connected state in a tunnel communication environment, enable detection of a physical layer problem by using the time period parameter of the T310 timer.

According to a third aspect, a communication method is provided, including:

generating requirement indication information, where the requirement indication information is used to indicate that user equipment UE needs to satisfy a radio resource management RRM requirement that is suitable for a high-speed mobile communication environment; and sending the requirement indication information to the UE within coverage of a cell.

With reference to the third aspect, in a first possible implementation, the sending the requirement indication information to the UE within coverage of a cell includes:

sending radio resource control RRC dedicated signaling to the UE within the coverage of the cell, where the RRC dedicated signaling carries the requirement indication information; or sending a system message to the UE within the coverage of the cell, where the system message carries the requirement indication information.

With reference to the third aspect or the first possible implementation of the third aspect, in a second possible implementation, the requirement indication information includes speed level information, the speed level information is used to indicate a speed level of the high-speed mobile communication environment, and the speed level of the high-speed mobile communication environment is used to enable the UE to determine whether the UE is in the high-speed mobile communication environment.

With reference to the third aspect, the first possible implementation of the third aspect, or the second possible implementation of the third aspect, in a third possible implementation, the requirement indication information includes range information of a high-speed dedicated cell identifier, and the range information of the high-speed dedicated cell identifier is used to indicate the cell located in the high-speed mobile communication environment.

With reference to the third aspect, the first possible implementation of the third aspect, the second possible implementation of the third aspect, or the third possible implementation of the third aspect, in a fourth possible implementation, before the sending the requirement indication information to the UE within coverage of a cell, the method further includes: receiving high-speed adjustment capability information reported by the UE; and the sending the requirement indication information to the UE within coverage of a cell includes:

determining, according to the high-speed adjustment capability information, that the UE has a capability of supporting the RRM requirement that is suitable for the high-speed mobile communication environment, and sending the requirement information to the UE.

With reference to the third aspect, the first possible implementation of the third aspect, the second possible implementation of the third aspect, the third possible implementation of the third aspect, or the fourth possible implementation of the third aspect, in a fifth possible implementation, before the sending the requirement indication information to the UE within coverage of a cell, the method further includes:

sending discontinuous reception cycle indication information to the UE, where the discontinuous reception cycle indication information is used to indicate a discontinuous reception cycle, and the discontinuous reception cycle is less than 0.32 seconds.

With reference to the third aspect, the first possible implementation of the third aspect, the second possible implementation of the third aspect, the third possible implementation of the third aspect, the fourth possible implementation of the third aspect, or the fifth possible implementation of the third aspect, in a sixth possible implementation, before the sending the requirement indication information to the UE within coverage of a cell, the method further includes:

sending time period parameter indication information to the UE, where the time period parameter indication information is used to indicate a time period parameter of a T310 timer, and the time period parameter is greater than 2 seconds.

According to a fourth aspect, a communication method is provided, including:

receiving requirement indication information sent by an access network device, where the requirement indication information is used to indicate that the user equipment needs to satisfy a radio resource management RRM requirement that is suitable for a high-speed mobile communication environment; and determining, according to the requirement indication information, that the RRM requirement that is suitable for the high-speed mobile communication environment needs to be satisfied.

With reference to the fourth aspect, in a first possible implementation, after the determining that the RRM requirement that is suitable for the high-speed mobile communication environment needs to be satisfied, the method further includes:

adjusting an RRM policy according to a preset RRM parameter suitable for the high-speed mobile communication environment.

With reference to the fourth aspect or the first possible implementation of the fourth aspect, in a second possible implementation, the requirement indication information includes speed level information, and the speed level information is used to indicate a speed level of the high-speed mobile communication environment; and the determining, according to the requirement indication information, that the RRM requirement that is suitable for the high-speed mobile communication environment needs to be satisfied includes:

determining, according to the speed level information, that the RRM requirement that is suitable for the high-speed mobile communication environment is satisfied.

With reference to the fourth aspect or the first possible implementation of the fourth aspect, in a third possible implementation, the requirement indication information includes range information of a high-speed dedicated cell identifier, and the range information of the high-speed dedicated cell identifier is used to indicate a cell located in the high-speed mobile communication environment; and the determining, according to the requirement indication information, that the RRM requirement that is suitable for the high-speed mobile communication environment needs to be satisfied includes:

if it is determined that a cell identifier of a currently accessed cell falls within a range of the high-speed dedicated cell identifier, determining that the RRM requirement that is suitable for the high-speed mobile communication environment needs to be satisfied.

With reference to the fourth aspect, the first possible implementation of the fourth aspect, the second possible implementation of the fourth aspect, or the third possible implementation of the fourth aspect, in a fourth possible implementation, before the receiving requirement indication information sent by an access network device, the method further includes:

reporting high-speed adjustment capability information to the access network device, where the high-speed adjustment capability information is used to indicate that the UE has a capability of supporting the RRM requirement that is suitable for the high-speed mobile communication environment.

With reference to the first possible implementation of the fourth aspect, the second possible implementation of the fourth aspect, the third possible implementation of the fourth aspect, or the fourth possible implementation of the fourth aspect, in a fifth possible implementation, before the adjusting an RRM policy according to a preset RRM parameter suitable for the high-speed mobile communication environment, the method further includes:

receiving discontinuous reception cycle indication information from the access network device, where the discontinuous reception cycle indication information is used to indicate a discontinuous reception cycle, and the discontinuous reception cycle is less than 0.32 seconds; and the adjusting an RRM policy according to a preset RRM parameter suitable for the high-speed mobile communication environment includes:

performing intra-frequency cell reselection according to the discontinuous reception cycle when the user equipment is in an idle state.

With reference to the first possible implementation of the fourth aspect, the second possible implementation of the fourth aspect, the third possible implementation of the fourth aspect, the fourth possible implementation of the fourth aspect, or the fifth possible implementation of the fourth aspect, in a sixth possible implementation, the adjusting an RRM policy according to a preset RRM parameter suitable for the high-speed mobile communication environment includes:

performing intra-frequency cell reselection according to preset evaluation time parameters of a cell reselection process when the user equipment is in the idle state, where among the evaluation time parameters of the cell reselection process, an evaluation time parameter corresponding to a discontinuous reception cycle of 2.56 seconds is less than 7.68 seconds, an evaluation time parameter corresponding to a discontinuous reception cycle of 1.28 seconds is less than 6.4 seconds, an evaluation time parameter corresponding to a discontinuous reception cycle of 0.64 seconds is less than 5.12 seconds, or an evaluation time parameter corresponding to a discontinuous reception cycle of 0.32 seconds is less than 5.12 seconds.

With reference to the first possible implementation of the fourth aspect, the second possible implementation of the fourth aspect, the third possible implementation of the fourth aspect, the fourth possible implementation of the fourth aspect, the fifth possible implementation of the fourth aspect, or the sixth possible implementation of the fourth aspect, in a seventh possible implementation, the adjusting an RRM policy according to a preset RRM parameter suitable for the high-speed mobile communication environment includes:

performing intra-frequency cell reselection according to a preset identification time parameter of the cell reselection process when the user equipment is in the idle state, where the identification time parameter of the cell reselection process is less than 20 discontinuous reception cycles.

With reference to the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, or the seventh possible implementation of the fourth aspect, in an eighth possible implementation, the adjusting an RRM policy according to a preset RRM parameter suitable for the high-speed mobile communication environment includes:

performing target cell identification according to preset target cell identification time parameters when the user equipment is in a connected state, where among the target cell identification time parameters, a target cell identification time parameter corresponding to a discontinuous reception cycle of 0.04 seconds is less than 0.8 seconds, a target cell identification time parameter corresponding to a discontinuous reception cycle greater than 0.04 seconds and not exceeding 0.08 seconds is less than 40 discontinuous reception cycles, a target cell identification time parameter corresponding to a discontinuous reception cycle of 0.128 seconds is less than 25 discontinuous reception cycles, or a target cell identification time parameter corresponding to a discontinuous reception cycle greater than 0.128 seconds and not exceeding 2.56 seconds is less than 20 discontinuous reception cycles.

With reference to the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, or the eighth possible implementation of the fourth aspect, in a ninth possible implementation, the adjusting an RRM policy according to a preset RRM parameter suitable for the high-speed mobile communication environment includes:

performing radio link monitoring according to preset in-synchronization/out-of-synchronization evaluation period parameters when the user equipment is in the connected state, where among the in-synchronization/out-of-synchronization evaluation period parameters, an in-synchronization/out-of-synchronization evaluation period parameter corresponding to a discontinuous reception cycle greater than 0.01 second and not exceeding 0.04 seconds is less than 20 discontinuous reception cycles, an in-synchronization/out-of-synchronization evaluation period parameter corresponding to a discontinuous reception cycle greater than 0.04 seconds and not exceeding 0.64 seconds is less than 10 discontinuous reception cycles, or an in-synchronization/out-of-synchronization evaluation period parameter corresponding to a discontinuous reception cycle greater than 0.64 seconds and not exceeding 2.56 seconds is less than five discontinuous reception cycles.

With reference to the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, the eighth possible implementation of the fourth aspect, or the ninth possible implementation of the fourth aspect, in a tenth possible implementation, the adjusting an RRM policy according to a preset RRM parameter suitable for the high-speed mobile communication environment includes:

performing measurement reporting according to a preset measurement parameter when the user equipment is in the connected state, where the measurement parameter is less than 200 milliseconds, a measurement parameter corresponding to a discontinuous reception cycle less than or equal to 0.04 seconds is less than 200 milliseconds, or a measurement parameter corresponding to a discontinuous reception cycle greater than 0.04 seconds and less than or equal to 2.56 seconds is less than five discontinuous reception cycles.

With reference to the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, the eighth possible implementation of the fourth aspect, the ninth possible implementation of the fourth aspect, or the tenth possible implementation of the fourth aspect, in an eleventh possible implementation, before the adjusting an RRM policy according to a preset RRM parameter suitable for the high-speed mobile communication environment, the method further includes:

receiving time period parameter indication information from the access network device, where the time period parameter indication information is used to indicate a time period parameter of a T310 timer, and the time period parameter is greater than 2 seconds; and the adjusting an RRM policy according to a preset RRM parameter suitable for the high-speed mobile communication environment includes:

when the user equipment is in a connected state in a tunnel communication environment, enabling detection of a physical layer problem by using the time period parameter of the T310 timer.

According to a fifth aspect, a communications system is provided, including at least one access network device and at least one user equipment, where the access network device generates requirement indication information, where the requirement indication information is used to indicate that the user equipment needs to satisfy a radio resource management RRM requirement that is suitable for a high-speed mobile communication environment; and sends the requirement indication information to the user equipment within coverage of a cell; and the user equipment receives the requirement indication information sent by the access network device; and determines, according to the requirement indication information, that the RRM requirement that is suitable for the high-speed mobile communication environment needs to be satisfied.

By implementing the embodiments of the present application, the access network device generates the requirement indication information, and sends the requirement indication information to the UE within the coverage of the cell. After receiving the requirement indication information, the UE determines, according to the requirement indication information, that the RRM requirement that is suitable for the high-speed mobile communication environment needs to be satisfied, so as to resolve a prior-art technical problem that UE passes through a target cell but fails to well complete RRM because the UE moves at a quite high speed. The UE can adjust the RRM policy according to the preset RRM parameter suitable for the high-speed mobile communication environment, to shorten an intra-frequency cell reselection time, shorten a target cell identification time, shorten an in-synchronization/out-of-synchronization evaluation time, or shorten a measurement period, so as to satisfy the RRM requirement in the high-speed mobile communication environment, and ensure and improve network performance.

BRIEF DESCRIPTION OF DRAWINGS

To describe the technical solutions in the embodiments of the present application more clearly, the following briefly describes the accompanying drawings required for describing the embodiments.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
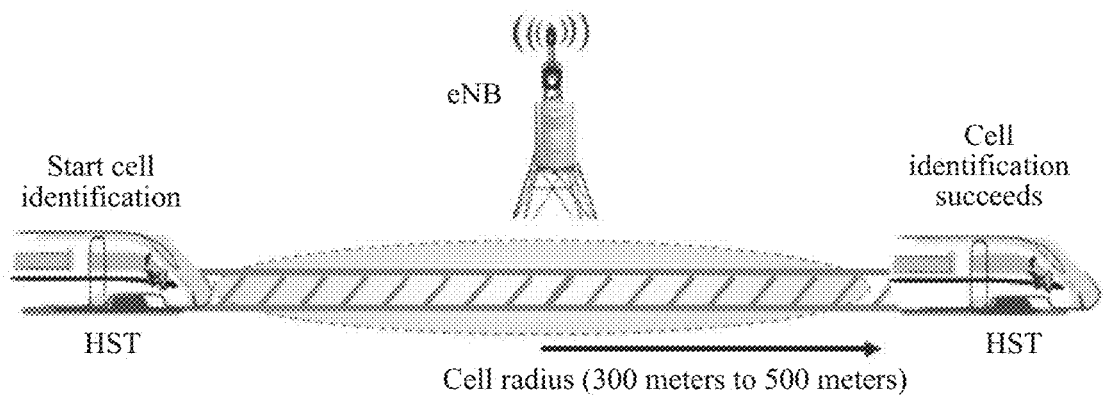
FIG. 1 is a schematic diagram of a scenario of radio resource management in a high-speed mobile communication environment.
Figure 2:
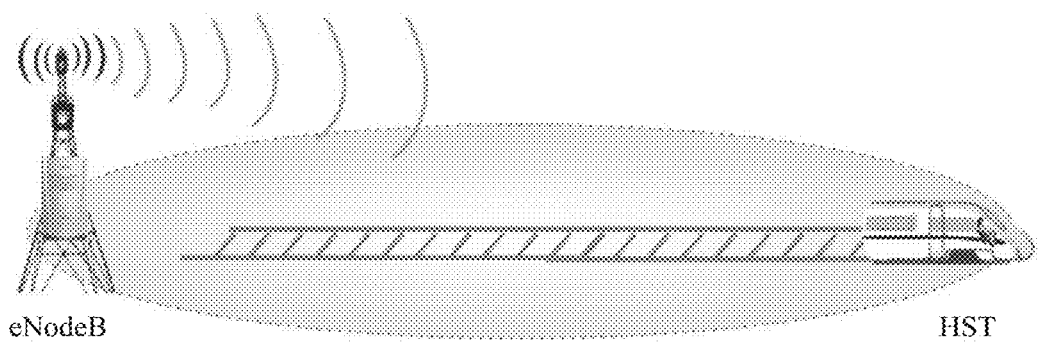
FIG. 2 is an architectural diagram of a communication application scenario suitable for a high-speed mobile communication environment according to an embodiment of the present application.

Referring to FIG. 2, FIG. 2 is an architectural diagram of a communication application scenario suitable for a high-speed mobile communication environment according to an embodiment of the present application. Description is performed by using an embodiment in which high-speed railway mobile communication is used as a high-speed mobile communication environment.

A user carrying UE embarks on an HST and leaves for a destination. On the way, the user may establish and keep an association with each access network device such as an evolved NodeB (eNodeB) shown in the figure by using the UE, to communicate with another user. The eNodeB is used as a bridge between UE in an evolved universal terrestrial radio access network (E-UTRAN) and an evolved packet core (EPC), and has the following functions:

(1) a radio resource management function, including radio bearer control, radio access control, connection mobility control, and uplink/downlink dynamic resource allocation for UE;

(2) IP header compression and user data stream encryption:

(3) paging message organization and sending;

(4) broadcast message organization and sending; and (5) measurement and measurement reporting configuration for mobility or scheduling.

An access network device in the embodiments of the present application may correspond to a different device in a different communications system, and includes but is not limited to a base station controller (BSC), a radio network controller (RNC), an eNodeB, or a NodeB. UE in the embodiments of the present application may include but is not limited to user equipment having a communication function, such as a mobile phone, a mobile computer, a tablet computer, a personal digital assistant (PDA), a media player, a smart TV, a smartwatch, smart glasses, or a smart band.

UE in a high-speed moving state still needs to perform radio resource management such as measurement, cell selection or reselection, handover, and radio link monitoring according to an RRM policy and an RRM parameter. A structure and a function of the access network device provided in the embodiments of the present application are described in detail below with reference to embodiments of FIG. 3 and FIG. 4.

Figure 3:
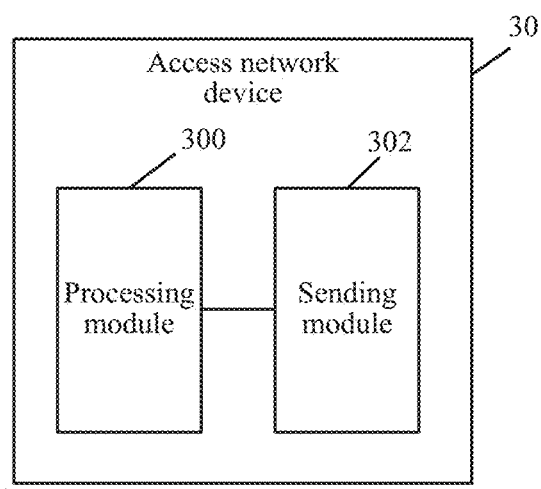
FIG. 3 is a schematic structural diagram of an access network device according to an embodiment of the present application.
Figure 4:
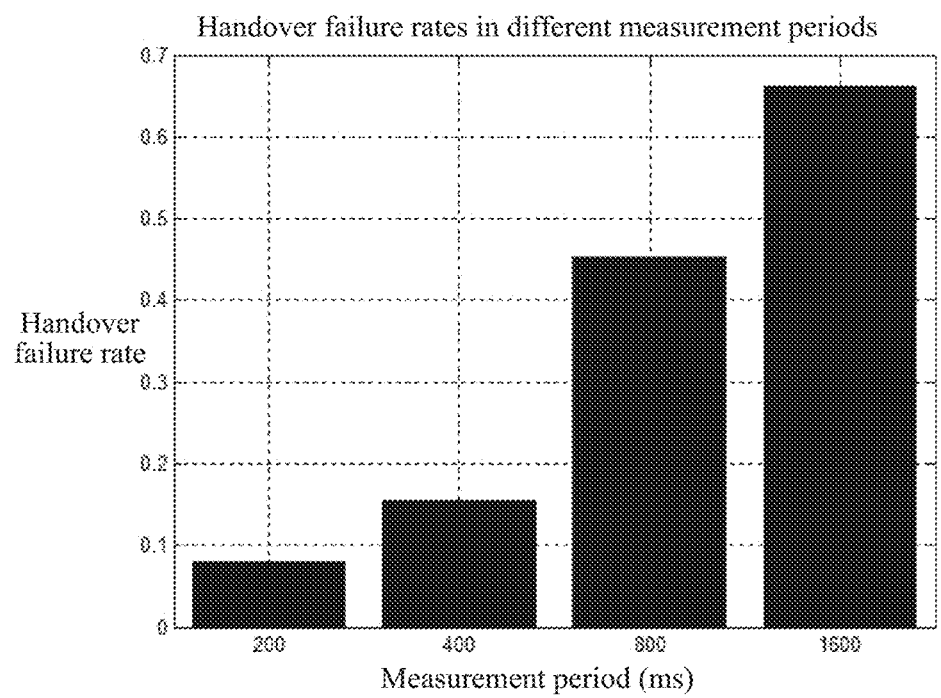
FIG. 4 is a schematic diagram of handover failure rates in different measurement periods according to an embodiment of the present application.

FIG. 3 is a schematic structural diagram of an access network device according to an embodiment of the present application. The access network device 30 may include a processing module 300 and a sending module 302.

The processing module 300 is configured to generate requirement indication information.

Specifically, the requirement indication information in this embodiment of the present application is used to indicate that UE needs to satisfy a radio resource management RRM requirement that is suitable for a high-speed mobile communication environment. The requirement indication information may be specifically set in a system message such as a downlink broadcast data frame for the UE, may be set in radio resource control (RRC) dedicated signaling, or may be independent signaling. This is not limited in the present application, provided that the access network device and the UE reach an agreement by means of pre-negotiation.

It may be understood that the requirement indication information in this embodiment of the present application may be information of one bit such as a bit "1" or a bit "0", may be information of at least two bits such as bits "01" or bits "100", or may be information of other content such as speed information of the UE or a particular identifier. This is not limited in the present application, provided that the access network device 30 and the UE reach, by means of pre-negotiation, an agreement that a piece of information is the requirement indication information.

The sending module 302 is configured to send the requirement indication information to the UE within coverage of a cell, so that the UE learns that the RRM requirement that is suitable for the high-speed mobile communication environment needs to be satisfied.

Specifically, the sending module 302 may send a system message to the UE within the coverage of the cell, where the system message carries the requirement indication information; or send radio resource control RRC dedicated signaling to the UE within the coverage of the cell, where the RRC dedicated signaling carries the requirement indication information. That is, the sending module 302 may send the requirement indication information to the UE by means of broadcasting a data frame in downlink to the UE within the coverage of the cell of the access network device, that is, the requirement indication information may be set in the broadcast data frame. Alternatively, for the UE in a connected state, the sending module 302 may send, by using the RRC dedicated signaling, the requirement indication information to the UE within the coverage of the cell of the access network device, that is, the requirement indication information may be set in the RRC dedicated signaling. Alternatively, the sending module 302 may directly send the requirement indication information independently to the UE by using a network interface. Therefore, the UE learns that the RRM requirement that is suitable for the high-speed mobile communication environment needs to be satisfied.

It should be noted that, compared with an RRM requirement of a conventional cellular network, the RRM requirement that is suitable for the high-speed mobile communication environment in the embodiments of the present application is a newly added RRM requirement specially suitable for a mobile communication environment of a high speed train or another high speed vehicle, the newly added RRM requirement may correspondingly include an RRM parameter or index suitable for the high-speed mobile communication environment, and the UE is required to be capable of satisfying the newly added RRM requirement in the high-speed mobile communication environment. Compared with the RRM requirement of the conventional cellular network, radio link failures can be reduced, handover failures can be reduced, and a throughput can be increased, thereby ensuring network performance. After receiving the requirement indication information, the UE learns that the RRM requirement that is suitable for the high-speed mobile communication environment needs to be satisfied, and may enhance intra-frequency cell reselection, target cell identification, radio link monitoring, measurement reporting, or the like according to performance of the UE, so as to satisfy the RRM requirement that is suitable for the high-speed mobile communication environment.

By implementing this embodiment of the present application, the access network device generates the requirement indication information, and sends the requirement indication information to the UE within the coverage of the cell. After receiving the requirement indication information, the UE determines, according to the requirement indication information, that the RRM requirement that is suitable for the high-speed mobile communication environment needs to be satisfied, so as to resolve a prior-art technical problem that UE passes through a target cell but fails to well complete RRM because the UE moves at a quite high speed. The UE can adjust an RRM policy according to the preset RRM parameter suitable for the high-speed mobile communication environment, to shorten an intra-frequency cell reselection time, shorten a target cell identification time, shorten an in-synchronization/out-of-synchronization evaluation time, or shorten a measurement period, so as to satisfy the RRM requirement in the high-speed mobile communication environment, and ensure and improve network performance.

More specifically, after receiving the requirement indication information, the UE may directly adjust an RRM policy according to a preset RRM parameter suitable for the high-speed mobile communication environment, so as to satisfy the RRM requirement that is suitable for the high-speed mobile communication environment.

The preset RRM parameter suitable for the high-speed mobile communication environment in this embodiment of the present application includes but is not limited to a DRX cycle parameter in an idle (IDLE) state, an evaluation time parameter of a cell reselection process in an IDLE state, an identification time parameter of a cell reselection process in an IDLE state, a target cell identification time parameter in a connected state, an in-synchronization/out-of-synchronization evaluation period parameter in a connected state, a measurement parameter in a connected state, a time period parameter of a T310 timer in a connected state, or the like. For example, the UE may use the DRX cycle parameter that is in the IDLE state and that is suitable for the high-speed mobile communication environment, so as to shorten a DRX cycle, thereby shortening an intra-frequency cell reselection time; use the evaluation time parameter that is of the cell reselection process in the IDLE state and that is suitable for the high-speed mobile communication environment, so as to shorten an evaluation time of the cell reselection process, thereby shortening an intra-frequency cell reselection time; use the identification time parameter that is of the cell reselection process in the IDLE state and that is suitable for the high-speed mobile communication environment, so as to shorten an identification time of the cell reselection process, thereby shortening an intra-frequency cell reselection time; use the target cell identification time parameter that is in the connected state and that is suitable for the high-speed mobile communication environment, so as to shorten a target cell identification time; use the in-synchronization/out-of-synchronization evaluation period parameter that is in the connected state and that is suitable for the high-speed mobile communication environment, so as to shorten an in-synchronization/out-of-synchronization evaluation time in the connected state; use the measurement parameter that is in the connected state and that is suitable for the high-speed mobile communication environment, so as to shorten a measurement period in the connected state; or the like.

Further, after the UE receives the requirement indication information, in addition to directly adjusting the RRM policy according to the preset RRM parameter suitable for the high-speed mobile communication environment, the UE may also first perform determining according to the requirement indication information, so as to determine whether current performance of the UE can satisfy the RRM requirement that is suitable for the high-speed mobile communication environment, and the UE adjusts the RRM policy according to the preset RRM parameter suitable for the high-speed mobile communication environment only if the current performance of the UE cannot satisfy the RRM requirement that is suitable for the high-speed mobile communication environment, so as to satisfy the RRM requirement that is suitable for the high-speed mobile communication environment.

For example, the requirement indication information generated by the processing module 300 may include speed level information. The speed level information is used to indicate a speed level of the high-speed mobile communication environment, and the speed level of the high-speed mobile communication environment is used to enable the UE to determine whether the UE is in the high-speed mobile communication environment. That is, the UE may determine, according to the speed level information, whether the UE is located in the high-speed mobile communication environment, thereby determining whether the RRM requirement that is suitable for the high-speed mobile communication environment can be satisfied currently, and when it is determined that the RRM requirement that is suitable for the high-speed mobile communication environment cannot be satisfied currently, the UE adjusts the RRM policy according to the preset RRM parameter suitable for the high-speed mobile communication environment, so as to satisfy the RRM requirement that is suitable for the high-speed mobile communication environment.

The speed level information may be specifically speed range information, that is, the access network device and the UE determine a plurality of speed ranges by means of pre-negotiation, for example:

normal, representing a UE speed: speed<100 km/h medium, representing a UE speed: 100 km/h<speed<200 km/h high, representing a UE speed: 200 km/h<speed<300 km/h, and very high, representing a UE speed: speed>300 km/h.

It may be understood that a speed value of each speed range is not limited to the foregoing example, and may be set to another speed value according to actual needs.

When the sending module 302 sends adjustment indication information to the UE by means of broadcasting a data frame in downlink to the UE within the coverage of the cell of the access network device, the processing module 300 may add a new information element (IE) to SystemInformationBlockType1, for example:

```
SystemInformationBlockType1::=   SEQUENCE {
  cellAccessRelatedInfo          SEQUENCE {
    plmn-IdentityList                PLMN-IdentityList,
    trackingAreaCode                 TrackingAreaCode,
    cellIdentity                 CellIdentity,
    cellBarred                       ENUMERATED {barred, notBarred},
    intraFreqReselection             ENUMERATED {allowed, notAllowed},
    csg-Indication                   BOOLEAN,
    csg-Identity                 CSG-Identity         OPTIONAL -- Need OR
  },
  cellSelectionInfo            SEQUENCE {
    q-RxLevMin                       Q-RxLevMin,
    q-RxLevMinOffset                 INTEGER (1..8) OPTIONAL -- Need OP
  },
  p-Max                        P-Max                   OPTIONAL,
  -- Need OP
  freqBandIndicator                FreqBandIndicator,
  schedulingInfoList               SchedulingInfoList,
  tdd-Config                       TDD-Config     OPTIONAL,-- Cond TDD
  si-WindowLength                  ENUMERATED {
                                       ms1, ms2, ms5, ms10, ms15, ms20,
                                       ms40},
  systemInfoValueTag               INTEGER (0..31),
  highspeedstate ENUMERATED {normal, medium, high, spare} OPTIONAL,
  nonCriticalExtension   SystemInformationBlockType1-v890-IEs   OPTIONAL
}
...
```

The foregoing bold part is the added new IE.

Alternatively, a new IE may be added to MasterInformationBlock, for example:

```
MasterInformationBlock::=      SEQUENCE {
  dl-Bandwidth                     ENUMERATED {
                                       n6, n15, n25, n50, n75,
                                       n100},
  phich-Config                     PHICH-Config,
  systemFrameNumber                BIT STRING (SIZE (8)),
  highspeedstate ENUMERATED {normal, medium, high, spare}
    OPTIONAL,
```

```
  spare                            BIT STRING (SIZE (9))
}
```

Similarly, the foregoing bold part is the added new IE.

When the sending module 302 sends, by using RRC dedicated signaling, the adjustment indication information to the UE within the coverage of the cell of the access network device, the processing module 300 may add a new IE to RRCConnectionReconfiguration, for example:

```
RRCConnectionReconfiguration::= SEQUENCE {
  rrc-TransactionIdentifier         RRC-TransactionIdentifier,
  criticalExtensions                CHOICE {
    c1                              CHOICE{
          rrcConnectionReconfiguration-r8
RRCConnectionReconfiguration-r8-IEs,
          spare7 NULL,
          spare6 NULL, spare5 NULL, spare4 NULL,
          spare3 NULL, spare2 NULL, spare1 NULL
    },
    criticalExtensionsFuture        SEQUENCE { }
  }
  highspeedstate ENUMERATED {normal, medium, high,
    spare} OPTIONAL,
}
```

Similarly, the foregoing bold part is the added new IE.

It should be noted that the access network device 30 may determine a speed range by means of positioning and analysis for the UE or another method. In the foregoing embodiment, in addition to SystemInformationBlockType1 or MasterInformationBlock, the speed level information may also be placed in another system message. Similarly, in addition to RRCConnectionReconfiguration, the speed level information may also be placed in another message of RRC signaling. This is not limited in the present application. A variable name and a variable type of the foregoing IE are not limited either, and the foregoing description lists only an example.

It should be further noted that, after the UE receives the speed level information, the UE may determine, according to the speed level information, whether the UE is located in the high-speed mobile communication environment, and specifically determine, according to the speed level information and the performance of the UE, whether the RRM requirement that is suitable for the high-speed mobile communication environment can be satisfied. For example, if the UE has relatively high performance, and although a current moving speed is relatively high, the UE can still support an RRM requirement in a current moving speed environment, the UE determines that the UE is not located in the high-speed mobile communication environment, and the RRM requirement that is suitable for the high-speed mobile communication environment can be satisfied currently. If the UE cannot support the RRM requirement in the current moving speed environment, the UE determines that the UE is located in the high-speed mobile communication environment, and the RRM requirement that is suitable for the high-speed mobile communication environment cannot be satisfied currently, and the UE needs to adjust the RRM policy according to the preset RRM parameter suitable for the high-speed mobile communication environment, so as to satisfy the RRM requirement that is suitable for the high-speed mobile communication environment.

For another example, the requirement indication information generated by the processing module 300 may further include range information of a high-speed dedicated cell identifier, and the range information of the high-speed dedicated cell identifier is used to indicate the cell located in the high-speed mobile communication environment. Therefore, the UE determines, according to the range information of the high-speed dedicated cell identifier, whether a cell identifier of a currently accessed cell falls within a range of the high-speed dedicated cell identifier. When it is determined that the cell identifier of the currently accessed cell falls within the range of the high-speed dedicated cell identifier, the UE is in the cell located in the high-speed mobile communication environment, and the UE needs to adjust the RRM policy according to the preset RRM parameter suitable for the high-speed mobile communication environment, so as to satisfy the RRM requirement that is suitable for the high-speed mobile communication environment.

When the UE enters cell coverage of the access network device 30, for example, when the UE in the idle state camps on the cell coverage of the access network device 30 by means of cell selection or cell reselection, or when the UE in the connected state accesses the cell coverage of the access network device 30 by means of handover or RRC reconstruction, the sending module 302 may send the requirement indication information to the UE by means of broadcasting a data frame in downlink to the UE within the coverage of the cell of the access network device, so as to inform the UE of cells that belong to high-speed dedicated cells. Specifically, a new IE may be added to SystemInformationBlockType4:

```
                HST-PhysCellIdRange      PhysCellIdRange     OPTIONAL,
                for example:
                SystemInformationBlockType4::=   SEQUENCE {
                    intraFreqNeighCellList      IntraFreqNeighCellList  OPTIONAL,-- Need OR
                    intraFreqBlackCellList      IntraFreqBlackCellList      OPTIONAL,-- Need
       OR
                    csg-PhysCellIdRange             PhysCellIdRange     OPTIONAL,-- Cond
       CSG
                    HST-PhysCellIdRange             PhysCellIdRange       OPTIONAL,
                    ...,
                    lateNonCriticalExtension        OCTET STRING          OPTIONAL
                }
                IntraFreqNeighCellList::=   SEQUENCE   (SIZE    (1..maxCellIntra))   OF
       IntraFreqNeighCellInfo
                IntraFreqNeighCellInfo::=   SEQUENCE {
                    physCellId                      PhysCellId,
                    q-OffsetCell                    Q-OffsetRange,
                    ...
                }
                IntraFreqBlackCellList::=   SEQUENCE   (SIZE    (1..maxCellBlack))   OF
       PhysCellIdRange
```

The foregoing bold part is the added new IE.

It may be understood that, in the foregoing embodiment, in addition to SystemInformationBlockType4, the range information of the high-speed dedicated cell identifier may also be placed in another system message. This is not limited in the present application. A variable name and a variable type of the foregoing IE are not limited either, and the foregoing description lists only an example.

It should be further noted that, after the UE receives the range information of the high-speed dedicated cell identifier, the UE determines whether the cell identifier of the currently accessed cell falls within the range of the high-speed dedicated cell identifier (PhysCellIdRange). If not, it indicates that the UE is not in the cell located in the high-speed mobile communication environment, and the UE learns that the RRM requirement that is suitable for the high-speed mobile communication environment does not need to be satisfied; otherwise, it indicates that the UE is in the cell located in the high-speed mobile communication environment, and the UE needs to adjust the RRM policy according to the preset RRM parameter suitable for the high-speed mobile communication environment, so as to satisfy the RRM requirement that is suitable for the high-speed mobile communication environment.

Optionally, the access network device 30 in this embodiment of the present application may further include a receiving module, configured to receive high-speed adjustment capability information reported by the UE within the coverage of the cell, so as to indicate that the UE has a capability of supporting the RRM requirement that is suitable for the high-speed mobile communication environment: and the processing module 300 is specifically configured to control, according to the received high-speed adjustment capability information, the sending module 302 to send the requirement indication information to the UE that has a high-speed adjustment capability. That is, if the access network device 30 learns that the UE has no capability of supporting the RRM requirement that is suitable for the high-speed mobile communication environment, the access network device 30 does not send the requirement indication information to the UE. The access network device 30 in this embodiment of the present application may send the requirement indication information only to the UE that has the capability of supporting the RRM requirement that is suitable for the high-speed mobile communication environment.

The following further describes in detail by using an example how the UE adjusts the RRM policy according to the preset RRM parameter suitable for the high-speed mobile communication environment, so as to satisfy the RRM requirement that is suitable for the high-speed mobile communication environment.

Specifically, the processing module 300 may be further configured to control the sending module 302 to send discontinuous reception cycle indication information to the UE, where the discontinuous reception cycle indication information is used to indicate a discontinuous reception cycle, and the discontinuous reception cycle is less than 0.32 seconds. That is, the access network device 30 may configure, for the UE, at least one discontinuous reception cycle suitable for the high-speed mobile communication environment: and the discontinuous reception cycle suitable for the high-speed mobile communication environment is less than 0.32 seconds.

Specifically, Table 1 shows a schematic parameter table that is of an intra-frequency cell reselection requirement of the UE in the idle state and that is provided in this embodiment of the present application.

TABLE 1

| Discontinuous reception cycle [s] | Idle-state cell identification time [s] (quantity of discontinuous reception cycles) | Idle-state evaluation time [s] (quantity of discontinuous reception cycles) | Traveled distance during identification (350 km/h) [m] |
|---|---|---|---|
| 0.16 | 5.76 (36) | 2.56 (16) | 560 |

TABLE 1-continued

| Discontinuous reception cycle [s] | Idle-state cell identification time [s] (quantity of discontinuous reception cycles) | Idle-state evaluation time [s] (quantity of discontinuous reception cycles) | Traveled distance during identification (350 km/h) [m] |
|---|---|---|---|
| 0.32 | 11.52 (36) | 5.12 (16) | 1120 |
| 0.64 | 17.92 (28) | 5.12 (8) | 1742 |
| 1.28 | 32 (25) | 6.4 (5) | 3111 |
| 2.56 | 58.88 (23) | 7.68 (3) | 5724 |

Based on IDLE-state DRX cycles (DRX cycle length) of 0.32 seconds, 0.64 seconds, 1.28 seconds, and 2.56 seconds on which two original communication parties reach an agreement by means of negotiation, an IDLE-state DRX cycle of 0.16 seconds (that is, the bold row in Table 1) suitable for the high-speed mobile communication environment is newly configured. Then, an allowable maximum idle-state evaluation time [s] (quantity of discontinuous reception cycles), that is, $T_{evaluate,E\text{-}UTRAN\_intra}$ [s] (number of DRX cycles) may be 16 DRX cycles of 2.56 seconds, and an allowable maximum idle-state cell identification time [s] (quantity of discontinuous reception cycles), that is, $T_{detect,EUTRAN\_Intra}$ [s] (number of DRX cycles) may be 36 DRX cycles of 5.76 seconds (including an identification time of 20 DRX cycles and an evaluation time of 16 DRX cycles). Therefore, if the UE moves at a speed of 350 km/h, an allowable maximum traveled distance (detect distance) during identification may be 560 meters. For DRX cycles of 0.32 seconds, 0.64 seconds, 1.28 seconds, and 2.56 seconds in a non-high-speed mobile communication environment, corresponding allowable traveled distances are respectively 1120 meters, 1742 meters, 3111 meters, and 5724 meters. That is, the allowable maximum traveled distance during identification may be greatly shortened.

More specifically, for DRX configuration of the UE in the idle state, a new DRX cycle, that is, a bold part shown below may be added to RadioResourceConfigCommon signaling in a broadcast message, that is, to RadioResourceConfigCommon, where rf16 indicates that a cycle is 16 radio frames, that is, 16*0.01 s=0.16 s.

```
RadioResourceConfigCommon::=         SEQUENCE {
    rach-ConfigCommon                RACH-ConfigCommon
OPTIONAL,-- Need ON
        prach-Config                 PRACH-Config,
        pdsch-ConfigCommon           PDSCH-ConfigCommon
OPTIONAL,-- Need ON
        pusch-ConfigCommon           PUSCH-ConfigCommon,
        phich-Config                 PHICH-Config
OPTIONAL,-- Need ON
        pucch-ConfigCommon           PUCCH-ConfigCommon
OPTIONAL,-- Need ON
        soundingRS-UL-ConfigCommon   SoundingRS-UL-ConfigCommon
OPTIONAL,-- Need ON
        uplinkPowerControlCommon     UplinkPowerControlCommon
OPTIONAL,-- Need ON
        antennaInfoCommon            AntennaInfoCommon
OPTIONAL,-- Need ON
        p-Max                        P-Max
OPTIONAL,-- Need OP
        tdd-Config                   TDD-Config
OPTIONAL,-- Cond TDD
        ul-CyclicPrefixLength        UL-CyclicPrefixLength,
        ...,
        [[ uplinkPowerControlCommon-v1020  UplinkPowerControlCommon-v1020
OPTIONAL -- Need ON
        ]],
        [[ tdd-Config-v1130          TDD-Config-v1130
OPTIONAL -- Cond TDD3
```

```
            ]]
         }
         RadioResourceConfigCommonPSCell-r12::=SEQUENCE {
            basicFields-r12                    RadioResourceConfigCommonSCell-r10,
            pucch-ConfigCommon-r12             PUCCH-ConfigCommon,
            rach-ConfigCommon-r12              RACH-ConfigCommon,
            uplinkPowerControlCommonPSCell-r12 UplinkPowerControlCommonPSCell-r12,
            ...
         }
         RadioResourceConfigCommonSCell-r10::= SEQUENCE {
            -- DL configuration as well as configuration applicable for DL and UL
            nonUL-Configuration-r10              SEQUENCE {
               -- 1: Cell characteristics
               dl-Bandwidth-r10                     ENUMERATED {n6, n15, n25,
n50, n75, n100},
               -- 2: Physical configuration, general
               antennaInfoCommon-r10                AntennaInfoCommon,
               mbsfn-SubframeConfigList-r10         MBSFN-SubframeConfigList
OPTIONAL,-- Need OR
               -- 3: Physical configuration, control
               phich-Config-r10                     PHICH-Config,
               -- 4: Physical configuration, physical channels
               pdsch-ConfigCommon-r10               PDSCH-ConfigCommon,
               tdd-Config-r10                       TDD-Config
OPTIONAL -- Cond TDDSCell
            },
            -- UL configuration
            ul-Configuration-r10                 SEQUENCE {
               ul-FreqInfo-r10                      SEQUENCE {
                  ul-CarrierFreq-r10                   ARFCN-ValueEUTRA
OPTIONAL,-- Need OP
                  ul-Bandwidth-r10                     ENUMERATED {n6, n15,
                                                      n25, n50, n75, n100} OPTIONAL,
-- Need OP
                  additionalSpectrumEmissionSCell-r10  AdditionalSpectrumEmission
               },
               p-Max-r10                     P-Max                      OPTIONAL,
-- Need OP
               uplinkPowerControlCommonSCell-r10
UplinkPowerControlCommonSCell-r10,
               -- A special version of IE UplinkPowerControlCommon may be introduced
               -- 3: Physical configuration, control
               soundingRS-UL-ConfigCommon-r10 SoundingRS-UL-ConfigCommon,
               ul-CyclicPrefixLength-r10      UL-CyclicPrefixLength,
               -- 4: Physical configuration, physical channels
               prach-ConfigSCell-r10          PRACH-ConfigSCell-r10      OPTIONAL,
-- Cond TDD-OR-NoR11
               pusch-ConfigCommon-r10         PUSCH-ConfigCommon
            }                                                            OPTIONAL,
-- Need OR
            ...,
            [[ ul-CarrierFreq-v1090         ARFCN-ValueEUTRA-v9e0
OPTIONAL -- Need OP
            ]],
            [[ rach-ConfigCommonSCell-r11   RACH-ConfigCommonSCell-r11
OPTIONAL,-- Cond ULSCell
               prach-ConfigSCell-r11         PRACH-Config               OPTIONAL,
-- Cond UL
               tdd-Config-v1130              TDD-Config-v1130           OPTIONAL,
-- Cond TDD2
               uplinkPowerControlCommonSCell-v1130
                                             UplinkPowerControlCommonSCell-v1130 OPTIONAL
-- Cond UL
            ]]
         }
         BCCH-Config::=              SEQUENCE {
            modificationPeriodCoeff     ENUMERATED {n2, n4, n8, n16}
         }
         PCCH-Config::=              SEQUENCE {
            defaultPagingCycle          ENUMERATED {
                                           rf16, rf32, rf64, rf128, rf256},
            nB                          ENUMERATED {
                                           fourT, twoT, oneT, halfT, quarterT,
oneEighthT,
                                           oneSixteenthT, oneThirtySecondT}
         }
         UL-CyclicPrefixLength::=    ENUMERATED {len1, len2}
            ...
```

It should be noted that the discontinuous reception cycle indication information may be set in a broadcast data frame. For example, the access network device 30 and each UE reach, by means of negotiation, an agreement that one piece of bit information is set between fields to indicate a DRX cycle that is used by UE located in the high-speed mobile communication environment to perform intra-frequency cell reselection. For example, the bit information is three bits, bits 000 indicate that a DRX cycle of 0.32 seconds is used to perform intra-frequency cell reselection, bits 001 indicate that a DRX cycle of 0.64 seconds is used to perform intra-frequency cell reselection, bits 010 indicates that a DRX cycle of 1.28 seconds is used to perform intra-frequency cell reselection, bits 011 indicate that a DRX cycle of 2.56 seconds is used to perform intra-frequency cell reselection, and bits 100 indicate that a DRX cycle of 0.16 seconds is used to perform intra-frequency cell reselection. That is, the sending module 302 of the access network device 30 may broadcast a data frame in downlink to the UE in the idle state, and the broadcast data frame is provided with the discontinuous reception cycle indication information (that is, the bits 100), so as to send the discontinuous reception cycle indication information to the UE. After the UE, in the idle state, located in the high-speed mobile communication environment receives and parses the discontinuous reception cycle indication information to obtain the bits 100, and when the RRM policy needs to be adjusted according to the preset RRM parameter suitable for the high-speed mobile communication environment, the UE may perform intra-frequency cell reselection according to the configured discontinuous reception cycle suitable for the high-speed mobile communication environment, that is, perform intra-frequency cell reselection by using the IDLE-state DRX cycle of 0.16 seconds suitable for the high-speed mobile communication environment in Table 1, thereby accelerating a cell reselection process, and shortening a traveled distance during cell reselection.

It should be further noted that Table 1 is only an embodiment of the present application, the present application is not limited to a case in Table 1, and another DRX cycle suitable for the high-speed mobile communication environment may be also set, for example, a DRX cycle less than 0.32 seconds such as a DRX cycle of 0.2 seconds or 0.1 second. A plurality of DRX cycles suitable for the high-speed mobile communication environment may be simultaneously set, provided that when the adjustment indication information is sent to the UE, a DRX cycle that is suitable for the high-speed mobile communication environment and that is used to perform intra-frequency cell reselection is indicated.

Optionally, when the UE is UE in the idle state, the adjusting an RRM policy according to a preset RRM parameter suitable for the high-speed mobile communication environment may further include: performing intra-frequency cell reselection according to preset evaluation time parameters of the cell reselection process, where among the evaluation time parameters of the cell reselection process, an evaluation time parameter corresponding to a discontinuous reception cycle of 2.56 seconds is less than 7.68 seconds, an evaluation time parameter corresponding to a discontinuous reception cycle of 1.28 seconds is less than 6.4 seconds, an evaluation time parameter corresponding to a discontinuous reception cycle of 0.64 seconds is less than 5.12 seconds, or an evaluation time parameter corresponding to a discontinuous reception cycle of 0.32 seconds is less than 5.12 seconds.

Specifically, the evaluation time parameter that is of the cell reselection process and that is suitable for the high-speed mobile communication environment may be pre-written by a vendor in a production process of the UE, or the evaluation time parameter that is of the cell reselection process and that is suitable for the high-speed mobile communication environment is preset by refreshing or updating an evaluation time parameter of the produced UE, and is stored in a storage unit. Table 2 shows a schematic parameter table that is of an intra-frequency cell reselection requirement of the UE in the idle state and that is provided in this embodiment of the present application.

TABLE 2

| Discontinuous reception cycle [s] | Idle-state cell identification time [s] (quantity of discontinuous reception cycles) | Idle-state evaluation time [s] (quantity of discontinuous reception cycles) | Idle-state evaluation time [s] suitable for high-speed mobile communication environment (quantity of discontinuous reception cycles) | Traveled distance during identification (350 km/h) [m] |
|---|---|---|---|---|
| 0.32 | 7.36 (23) | 5.12 (16) | 0.96 (3) | 716 |
| 0.64 | 14.72 (23) | 5.12 (8) | 1.92 (3) | 1431 |
| 1.28 | 29.44 (23) | 6.4 (5) | 3.84 (3) | 2862 |
| 2.56 | 58.88 (23) | 7.68 (3) | 7.68 (3) | 5724 |

Based on that DRX cycle lengths of 0.32 seconds, 0.64 seconds, 1.28 seconds, and 2.56 seconds on which two original communication parties reach, by means of negotiation, an agreement respectively correspond to idle-state evaluation times [s] (quantity of discontinuous reception cycles), that is, $T_{evaluate,E\text{-}UTRAN\_intra}$ [s] (number of DRX cycles), that are 16 DRX cycles of 5.12 seconds, eight DRX cycles of 5.12 seconds, five DRX cycles of 6.4 seconds, and three DRX cycles of 7.68 seconds, $T_{evaluate,E\text{-}UTRAN\_intra}$ [s] (number of DRX cycles) (that is, the bold column in Table 2) suitable for the high-speed mobile communication environment is newly set, and is respectively three DRX cycles of 0.96 seconds, three DRX cycles of 1.92 seconds, three DRX cycles of 3.84 seconds, and three DRX cycles of 7.68 seconds. The evaluation time parameter that is of the cell reselection process and that is suitable for the high-speed mobile communication environment in this embodiment of the present application is $T_{evaluate,E\text{-}UTRAN\_intra}$ [s] (number of DRX cycles) suitable for the high-speed mobile communication environment in Table 2. That is, excluding the DRX cycle length of 2.56 seconds, $T_{evaluate,E\text{-}UTRAN\_intra}$ [s] (number of DRX cycles) suitable for the high-speed mobile communication environment and corresponding to each remaining DRX cycle length of less than 2.56 seconds is less than $T_{evaluate,E\text{-}UTRAN\_intra}$ [s] (number of DRX cycles) in a non-high-speed mobile communication environment. Therefore, if the UE moves at a speed of 350 km/h, allowable maximum traveled distances (detect distance) during identification may be 716 meters, 1431 meters, and 2862 meters respectively. Compared with 1120 meters, 1742 meters, and 3111 meters in the non-high-speed mobile communication environment, the allowable maximum traveled distances during identification may be greatly reduced.

It should be noted that the requirement indication information in this embodiment of the present application may be set in a broadcast data frame. For example, the access network device 30 and each UE reach, by means of negotiation, an agreement that one bit is set between fields to instruct the UE to perform intra-frequency cell reselection according to the preset evaluation time parameter that is of the cell reselection process and that is suitable for the high-speed mobile communication environment. For example, the requirement indication information, that is, a bold part shown below, is set in SystemInformationBlockType1.

the present application. For example, if the Boolean variable is a bit 1 (that is, the requirement indication information), it indicates that intra-frequency cell reselection needs to be performed according to the preset evaluation time parameter that is of the cell reselection process and that is suitable for the high-speed mobile communication environment: if the Boolean variable is a bit 0, it indicates that intra-frequency cell reselection does not need to be performed according to the preset evaluation time parameter that is of the cell reselection process and that is suitable for the high-speed mobile communication environment. That is, the sending module 302 of the access network device 30 may broadcast a data frame in downlink to the UE in the idle state, and the broadcast data frame is provided with the requirement indication information, so as to send the requirement indication information to the UE. After receiving the require-

```
              SystemInformationBlockType1::=   SEQUENCE {
              cellAccessRelatedInfo            SEQUENCE {
                  plmn-IdentityList               PLMN-IdentityList,
                  trackingAreaCode                TrackingAreaCode,
                  cellIdentity                    CellIdentity,
                  cellBarred                          ENUMERATED {barred, notBarred},
                  intraFreqReselection            ENUMERATED {allowed, notAllowed},
                  csg-Indication                  BOOLEAN,
                  csg-Identity                    CSG-Identity                  OPTIONAL --
Need OR
              },
              cellSelectionInfo                SEQUENCE {
                  q-RxLevMin                          Q-RxLevMin,
                  q-RxLevMinOffset                INTEGER (1..8)                OPTIONAL --
Need OP
              },
              p-Max                            P-Max                         OPTIONAL,
                  -- Need OP
              freqBandIndicator                FreqBandIndicator,
              schedulingInfoList               SchedulingInfoList,
              tdd-Config                       TDD-Config                    OPTIONAL,--
Cond TDD
              si-WindowLength                      ENUMERATED {
                                                   ms1, ms2, ms5, ms10, ms15, ms20,
                                                   ms40},
              systemInfoValueTag               INTEGER (0..31),
              highspeedRRM-Indication          BOOLEAN                       OPTIONAL,
              nonCriticalExtension             SystemInformationBlockType1-v890-IEs   OPTIONAL
              }
              ...
```

Alternatively, the requirement indication information, that is, a bold part shown below, is set in MasterInformationBlock.

ment indication information, the UE, in the idle state, located in the high-speed mobile communication environment learns that intra-frequency cell reselection needs to be

```
MasterInformationBlock::=    SEQUENCE {
    dl-Bandwidth                 ENUMERATED {
                                     n6, n15, n25, n50, n75, n100},
    phich-Config                 PHICH-Config,
    systemFrameNumber            BIT STRING (SIZE (8)),
    highspeedRRM-Indication      BOOLEAN              OPTIONAL,
    spare                        BIT STRING (SIZE (9))
}
```

It may be understood that, in the foregoing embodiment, in addition to SystemInformationBlockType1 and MasterInformationBlock, the requirement indication information may be also set in another system message. This is not limited in the present application. A variable name and a variable type of the foregoing IE are not limited. A Boolean variable highspeedRRM-Indication herein is used to indicate whether a terminal should satisfy the RRM requirement that is suitable for the high-speed mobile communication environment, and is only an example. This is not limited in performed according to the preset evaluation time parameter that is of the cell reselection process and that is suitable for the high-speed mobile communication environment. For example, evaluation on the cell reselection process is completed by using a maximum time of three DRX cycles of 0.96 seconds in Table 2, thereby accelerating a cell reselection process, and shortening a traveled distance during cell reselection.

It should be further noted that Table 2 is only an embodiment of the present application, and the present application is not limited to a case in Table 2. That is, evaluation time parameters corresponding to a discontinuous reception cycle less than 2.56 seconds are unnecessarily all shortened to three DRX cycles, and may be also set to another value. For example, the evaluation time parameter corresponding to the DRX cycle of 0.32 seconds is two DRX cycles of 0.64 seconds, and the evaluation time parameter corresponding to the DRX cycle of 1.28 seconds is four DRX cycles of 5.12 seconds. Provided that an evaluation time parameter is less than an evaluation time parameter of a cell reselection process in a non-high-speed mobile communication environment, a cell reselection process may be accelerated, and a traveled distance during cell reselection may be shortened. It may be understood that an evaluation time parameter corresponding to a discontinuous reception cycle of 2.56 seconds in this embodiment of the present application may be similarly set to less than three DRX cycles of 7.68 seconds. This is not limited in the present application.

Optionally, when the UE is UE in the idle state, the adjusting an RRM policy according to a preset RRM parameter suitable for the high-speed mobile communication environment may further include: performing intra-frequency cell reselection according to a preset identification time parameter of the cell reselection process, where the identification time parameter of the cell reselection process is less than 20 discontinuous reception cycles, so as to shorten the intra-frequency cell reselection time.

Specifically, the identification time parameter that is of the cell reselection process and that is suitable for the high-speed mobile communication environment may be prewritten by a vendor in a production process of the UE, or the identification time parameter that is of the cell reselection process and that is suitable for the high-speed mobile communication environment is preset by refreshing or updating an identification time parameter of the produced UE, and is stored in a storage unit. Table 3 shows a schematic parameter table that is of an intra-frequency cell reselection requirement of the UE in the idle state and that is provided in this embodiment of the present application.

8.32 seconds, 18 DRX cycles of 11.52 seconds, 15 DRX cycles of 19.2 seconds, and 13 DRX cycles of 33.28 seconds.

The identification time parameter that is of the cell reselection process and that is suitable for the high-speed mobile communication environment in this embodiment of the present application and the idle-state evaluation time [s] (quantity of discontinuous reception cycles) in Table 3 are added up to obtain $T_{detect,EUTRAN\_Intra}$ [s] (number of DRX cycles) suitable for the high-speed mobile communication environment in Table 3. It may be learned from Table 3 that the identification time parameter that is of the cell reselection process and that is suitable for the high-speed mobile communication environment in this embodiment of the present application is an identification time of 10 DRX cycles, and an identification time parameter is 20 DRX cycles in a non-high-speed mobile communication environment. For example, the identification time parameter that is of the cell reselection process, that is suitable for the high-speed mobile communication environment, and that is corresponding to a DRX cycle of 0.32 seconds is 10 DRX cycles, and the idle-state evaluation time [s] is 16 DRX cycles, so that an idle-state cell identification time of 26 DRX cycles is totally obtained. The identification time parameter that is of the cell reselection process in the non-high-speed mobile communication environment and that is corresponding to a DRX cycle of 0.32 seconds is 20 DRX cycles, and the idle-state evaluation time [s] is 16 DRX cycles, so that an idle-state cell identification time of 36 DRX cycles is totally obtained. Therefore, if the UE moves at a speed of 350 km/h, allowable maximum traveled distances (detect distance) during identification may be 809 meters, 1120 meters, 1867 meters, and 3236 meters respectively. Compared with 1120 meters, 1742 meters, 3111 meters, and 5724 meters in the non-high-speed mobile communication environment, the allowable maximum traveled distances during identification may be greatly reduced.

It should be noted that the requirement indication information in this embodiment of the present application may be

TABLE 3

| Discontinuous reception cycle [s] | Idle-state cell identification time [s] (quantity of discontinuous reception cycles) | Idle-state identification time [s] suitable for high-speed mobile communication environment (quantity of discontinuous reception cycles) | Idle-state evaluation time [s] (quantity of discontinuous reception cycles) | Traveled distance during identification (350 km/h) [m] |
|---|---|---|---|---|
| 0.32 | 11.52 (36) | 8.32 (26) | 5.12 (16) | 809 |
| 0.64 | 17.92 (28) | 11.52 (18) | 5.12 (8) | 1120 |
| 1.28 | 32 (25) | 19.2 (15) | 6.4 (5) | 1867 |
| 2.56 | 58.88 (23) | 33.28 (13) | 7.68 (3) | 3236 |

Based on that DRX cycle lengths of 0.32 seconds, 0.64 seconds, 1.28 seconds, and 2.56 seconds on which two original communication parties reach, by means of negotiation, an agreement respectively correspond to idle-state cell identification times [s] (quantity of discontinuous reception cycles), that is, $T_{detect,EUTRAN\_Intra}$ [s] (number of DRX cycles), that are 36 DRX cycles of 11.52 seconds, 28 DRX cycles of 17.92 seconds, 25 DRX cycles of 32 seconds, and 23 DRX cycles of 58.88 seconds, $T_{detect,EUTRAN\_Intra}$ [s] (number of DRX cycles) (that is, the bold column in Table 3) suitable for the high-speed mobile communication environment is newly set, and is respectively 26 DRX cycles of set in a broadcast data frame. For example, the access network device 30 and each UE reach, by means of negotiation, an agreement that one bit is set between fields to instruct the UE to perform intra-frequency cell reselection according to the preset identification time parameter that is of the cell reselection process and that is suitable for the high-speed mobile communication environment. For example, a bit 1 (that is, the requirement indication information) indicates that intra-frequency cell reselection needs to be performed according to the preset identification time parameter that is of the cell reselection process and that is suitable for the high-speed mobile communication environment, and a bit 0 indicates that intra-frequency cell reselection does not need to be performed according to the preset identification time parameter that is of the cell reselection process and that is suitable for the high-speed mobile communication environment. For details about how to set the requirement indication information in the broadcast data frame, refer to the implementation described in the embodiment of Table 2. Details are not described herein again.

The sending module 302 of the access network device 30 may broadcast a data frame in downlink to the UE in the idle state, and the broadcast data frame is provided with the requirement indication information, so as to send the requirement indication information to the UE. After receiving the requirement indication information, the UE in the idle state learns that intra-frequency cell reselection needs to be performed according to the preset identification time parameter that is of the cell reselection process and that is suitable for the high-speed mobile communication environment, for example, evaluation on the cell reselection process is completed by using a maximum time of 26 DRX cycles of 8.32 seconds in Table 3, and then the identification time is shortened by means of improving an identification algorithm, increasing a measurement frequency, or the like, so as to complete identification within 8.32 seconds, thereby accelerating a cell reselection process, and shortening a traveled distance during cell reselection.

It should be further noted that Table 3 is only an embodiment of the present application, and the present application is not limited to a case in Table 3. That is, in addition to 10 DRX cycles, the identification time parameter that is of the cell reselection process and that is suitable for the high-speed mobile communication environment may also be eight DRX cycles, 11 DRX cycles, 15 DRX cycles, 17 DRX cycles, or the like. Provided that the identification time parameter is less than 20 DRX cycles, a cell reselection process may be accelerated, and a traveled distance during cell reselection may be shortened.

Optionally, when the UE is UE in the connected state, the adjusting an RRM policy according to a preset RRM parameter suitable for the high-speed mobile communication environment may further include: performing target cell identification according to preset target cell identification time parameters, where among the target cell identification time parameters, a target cell identification time parameter corresponding to a discontinuous reception cycle of 0.04 seconds is less than 0.8 seconds, a target cell identification time parameter corresponding to a discontinuous reception cycle greater than 0.04 seconds and not exceeding 0.08 seconds is less than 40 discontinuous reception cycles, a target cell identification time parameter corresponding to a discontinuous reception cycle of 0.128 seconds is less than 25 discontinuous reception cycles, or a target cell identification time parameter corresponding to a discontinuous reception cycle greater than 0.128 seconds and not exceeding 2.56 seconds is less than 20 discontinuous reception cycles.

Specifically, the target cell identification time parameter suitable for the high-speed mobile communication environment may be pre-written by a vendor in a production process of the UE, or the target cell identification time parameter suitable for the high-speed mobile communication environment is preset by refreshing or updating an identification time parameter of the produced UE, and is stored in a storage unit. Table 4 shows a schematic parameter table that is of an intra-frequency cell search requirement of the UE in the connected state and that is provided in this embodiment of the present application.

TABLE 4

| Discontinuous reception cycle [s] | Target cell identification time parameter [s] (discontinuous reception cycle) | Target cell identification time parameter [s] suitable for high-speed mobile communication environment (discontinuous reception cycle) |
|---|---|---|
| ≤0.04 | 0.8 (Note1) | 0.8 (Note1) |
| 0.04 < DRX-cycle ≤ 0.08 | Note2 (40) | Note2 (20) |
| 0.128 | 3.2 (25) | 2.56 (20) |
| 0.128 < DRX-cycle ≤ 2.56 | Note2 (20) | Note2 (20) |

Note1:
A quantity of discontinuous reception cycles depends on discontinuous reception cycles that are being used.
Note2:
A needed time depends on discontinuous reception cycles that are being used.

Based on that a DRX cycle less than or equal to 0.04 seconds, a DRX cycle greater than 0.04 seconds and less than or equal to 0.08 seconds, a DRX cycle of 0.128 seconds, and a DRX cycle greater than 0.128 seconds and less than or equal to 2.56 seconds on which two original communication parties reach, by means of negotiation, an agreement respectively correspond to target cell identification time parameters [s] (discontinuous reception cycles), that is, $T_{identify\_intra}$ (s) (DRX cycles), that are 0.8 seconds, 40 DRX cycles, 25 DRX cycles of 3.2 seconds, and 20 DRX cycles, target cell identification time parameters (that is, the bold column in Table 4) suitable for the high-speed mobile communication environment are newly set, and are respectively 0.8 seconds, 20 DRX cycles, 20 DRX cycles of 2.56 seconds, and 20 DRX cycles. That is, a target cell identification time parameter corresponding to a discontinuous reception cycle greater than 0.04 seconds and not exceeding 0.128 seconds is less than a target cell identification time parameter in a non-high-speed mobile communication environment. Therefore, if the UE moves at a speed of 350 km/h, target cell identification is performed according to the specified target cell identification time parameter suitable for the high-speed mobile communication environment, and a target cell identification time may be greatly shortened.

It should be noted that the requirement indication information may be set in a broadcast data frame. For example, the access network device 30 and each UE reach, by means of negotiation, an agreement that one bit is set between fields to instruct the UE whether to perform target cell identification according to the preset target cell identification time parameter suitable for the high-speed mobile communication environment. For details about how to set the requirement indication information in the broadcast data frame, refer to the implementation described in the embodiment of Table 2. Details are not described herein again. Optionally, the requirement indication information in this embodiment of the present application may be sent to the UE in the connected state by using RRC dedicated signaling, that is, the RRC dedicated signaling may carry a bit as the requirement indication information, so as to instruct the UE whether to perform target cell identification according to the preset target cell identification time parameter suitable for the high-speed mobile communication environment. Specifically, the requirement indication information, that is, a bold part shown below, may be set in RRCConnectionReconfiguration.

```
RRCConnectionReconfiguration::= SEQUENCE {
    rrc-TransactionIdentifier         RRC-TransactionIdentifier,
    criticalExtensions                CHOICE {
        c1                            CHOICE{
            rrcConnectionReconfiguration-r8
RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture      SEQUENCE { }
    }
    highspeedRRM-Indication           BOOLEAN           OPTIONAL
}
...
```

It may be understood that, in the foregoing embodiment, in addition to the RRC dedicated signaling RRCConnectionReconfiguration, the requirement indication information may be also set in another system message. This is not limited in the present application. A variable name and a variable type of the foregoing IE are not limited. A Boolean variable highspeedRRM-Indication herein is used to indicate whether a terminal should satisfy the RRM requirement that is suitable for the high-speed mobile communication environment, and is only an example. This is not limited in the present application. For example, if the Boolean variable is a bit 1 (that is, the requirement indication information), it indicates that target cell identification needs to be performed according to the preset target cell identification time parameter suitable for the high-speed mobile communication environment; if the Boolean variable is a bit 0, it indicates that target cell identification does not need to be performed according to the preset target cell identification time parameter suitable for the high-speed mobile communication environment.

That is, the sending module 302 of the access network device 30 may broadcast a data frame in downlink to the UE in the connected state, where the broadcast data frame is provided with the requirement indication information, or send the RRC dedicated signaling carrying the requirement indication information to the UE in the connected state, so as to send the requirement indication information to the UE. After receiving the requirement indication information, the UE, in the connected state, located in the high-speed mobile communication environment learns that target cell identification needs to be performed according to the preset target cell identification time parameter suitable for the high-speed mobile communication environment. Then, the identification time is shortened by means of improving an identification algorithm, increasing a measurement frequency, or the like, so as to implement identification within a requirement time length, thereby accelerating a cell identification process, and shortening a traveled distance during cell identification.

It should be further noted that Table 4 is only an embodiment of the present application, and the present application is not limited to a case in Table 4. That is, in addition to that a target cell identification time corresponding to a DRX cycle greater than 0.04 seconds and not exceeding 0.128 seconds is 20 DRX cycles, the target cell identification time parameter suitable for the high-speed mobile communication environment may also be 15 DRX cycles, 17 DRX cycles, 19 DRX cycles, or the like. Provided that a target cell identification time is less than a target cell identification time corresponding to a non-high-speed mobile communication environment, a cell reselection process may be accelerated, and a traveled distance during cell reselection may be shortened. It may be understood that a target cell identification time corresponding to a DRX cycle less than or equal to 0.04 seconds, and a target cell identification time corresponding to a DRX cycle greater than 0.128 seconds and less than or equal to 2.56 seconds may be similarly set to less than the target cell identification time corresponding to the non-high-speed mobile communication environment. This is not limited in the present application.

Optionally, when the UE is UE in the connected state, the adjusting an RRM policy according to a preset RRM parameter suitable for the high-speed mobile communication environment may further include: performing radio link monitoring according to preset in-synchronization/out-of-synchronization evaluation period parameters, where among the in-synchronization/out-of-synchronization evaluation period parameters, an in-synchronization/out-of-synchronization evaluation period parameter corresponding to a discontinuous reception cycle greater than 0.01 second and not exceeding 0.04 seconds is less than 20 discontinuous reception cycles, an in-synchronization/out-of-synchronization evaluation period parameter corresponding to a discontinuous reception cycle greater than 0.04 seconds and not exceeding 0.64 seconds is less than 10 discontinuous reception cycles, or an in-synchronization/out-of-synchronization evaluation period parameter corresponding to a discontinuous reception cycle greater than 0.64 seconds and not exceeding 2.56 seconds is less than five discontinuous reception cycles.

Specifically, the in-synchronization/out-of-synchronization evaluation period parameter suitable for the high-speed mobile communication environment may be pre-written by a vendor in a production process of the UE, or the in-synchronization/out-of-synchronization evaluation period parameter suitable for the high-speed mobile communication environment is preset by refreshing or updating an in-synchronization/out-of-synchronization evaluation period parameter of the produced UE, and is stored in a storage unit. For example, Table 5 shows a schematic parameter table that is of a Qout/Qin evaluation time used for radio link monitoring and that is provided in this embodiment of the present application.

TABLE 5

| Discontinuous reception cycle [s] | In-synchronization/ out-of-synchronization evaluation period parameter [s] (discontinuous reception cycle) | In-synchronization/ out-of-synchronization evaluation period parameter [s] suitable for high-speed mobile communication environment (discontinuous reception cycle) |
|---|---|---|
| ≤0.01 | No DRX cycle requirement is stipulated in clause 7.6.2.1. | No DRX cycle requirement is stipulated in clause 7.6.2.1. |
| 0.01 < DRX cycle ≤ 0.04 | (20) | (20) |
| 0.04 < DRX cycle ≤ 0.64 | (10) | (5) |
| 0.64 < DRX cycle ≤ 2.56 | (5) | (2) |

Based on that a DRX cycle greater than 0.01 second and less than or equal to 0.04 seconds, a DRX cycle greater than 0.04 seconds and less than or equal to 0.64 seconds, and a DRX cycle greater than 0.64 seconds and less than or equal to 2.56 seconds on which two original communication parties reach, by means of negotiation, an agreement respectively correspond to in-synchronization/out-of-synchronization evaluation period parameters [s] (discontinuous reception cycles), that is, $T_{Evaluate\_Q_{out\_DRX}}$ and $T_{Evaluate\_Q_{in\_DRX}}$ (s) (DRX cycles), that are 20 DRX cycles, 10 DRX cycles, and five DRX cycle, target cell identification time parameters (that is, the bold column in Table 5) suitable for the high-speed mobile communication environment are newly set, and are respectively 20 DRX cycles, five DRX cycle, and two DRX cycle. That is, an in-synchronization/out-of-synchronization evaluation period parameter corresponding to a discontinuous reception cycle greater than 0.04 seconds is less than an in-synchronization/out-of-synchronization evaluation period parameter in a non-high-speed mobile communication environment. Therefore, if the UE moves at a speed of 350 km/h, radio link monitoring is performed according to the specified in-synchronization/out-of-synchronization evaluation period parameter suitable for the high-speed mobile communication environment, and an in-synchronization/out-of-synchronization evaluation time may be greatly shortened, so that radio link monitoring becomes more precise.

It should be noted that the requirement indication information in this embodiment of the present application may be set in a broadcast data frame. For example, the access network device 30 and each UE reach, by means of negotiation, an agreement that one bit is set between fields to instruct the UE whether to perform radio link monitoring according to the preset in-synchronization/out-of-synchronization evaluation period parameter suitable for the high-speed mobile communication environment. Alternatively, the requirement indication information may be sent to the UE by using RRC dedicated signaling, that is, the RRC dedicated signaling may carry a bit as the requirement indication information, so as to instruct the UE whether to perform radio link monitoring according to the preset in-synchronization/out-of-synchronization evaluation period parameter suitable for the high-speed mobile communication environment. For example, a bit 1 (that is, the requirement indication information) indicates that radio link monitoring needs to be performed according to the preset in-synchronization/out-of-synchronization evaluation period parameter suitable for the high-speed mobile communication environment, and a bit 0 indicates that radio link monitoring does not need to be performed according to the preset in-synchronization/out-of-synchronization evaluation period parameter suitable for the high-speed mobile communication environment. Specifically, for setting of the requirement indication information, refer to the implementations described in the embodiments of Table 2 and Table 4. Details are not described herein again.

That is, the sending module 302 of the access network device 30 may broadcast a data frame in downlink to the UE in the connected state, where the broadcast data frame is provided with the requirement indication information, or send the RRC signaling carrying the requirement indication information to the UE in the connected state, so as to send the requirement indication information to the UE. After the UE, in the connected state, located in the high-speed mobile communication environment receives the requirement indication information, if the UE learns that radio link monitoring needs to be performed according to the preset in-synchronization/out-of-synchronization evaluation period parameter suitable for the high-speed mobile communication environment, for example, if an in-synchronization/out-of-synchronization evaluation period parameter corresponding to a DRX cycle greater than 0.04 seconds and less than or equal to 0.64 seconds is five DRX cycles, the UE reports an evaluation report to the access network device 30 after evaluation is completed in the five DRX cycles. Compared with 10 DRX cycles for evaluation in the non-high-speed mobile communication environment, an in-synchronization/out-of-synchronization evaluation time may be shortened, and a traveled distance during in-synchronization/out-of-synchronization evaluation may be shortened, so that radio link monitoring becomes more precise.

It should be further noted that Table 5 is only an embodiment of the present application, and the present application is not limited to a case in Table 5. That is, in addition to being set to five DRX cycles, the in-synchronization/out-of-synchronization evaluation period parameter corresponding to the DRX cycle greater than 0.04 seconds and less than or equal to 0.64 seconds may be also set to four DRX cycles, six DRX cycles, eight DRX cycles, or the like. Similarly, in addition to being set to two DRX cycles, the in-synchronization/out-of-synchronization evaluation period parameter corresponding to the DRX cycle greater than 0.64 seconds and less than or equal to 2.56 seconds may be also set to three DRX cycles, one DRX cycle, or the like. It may be understood that, in addition to being set to 20 DRX cycles, the in-synchronization/out-of-synchronization evaluation period parameter corresponding to the DRX cycle greater than 0.01 second and less than or equal to 0.04 seconds may be also set to 15 DRX cycles, 16 DRX cycles, 19 DRX cycles, or the like. This is not limited in the present application.

Optionally, when the UE is UE in the connected state, the adjusting an RRM policy according to a preset RRM parameter suitable for the high-speed mobile communication environment may further include: performing measurement reporting according to a preset measurement parameter, where the measurement parameter is less than 200 milliseconds, a measurement parameter corresponding to a discontinuous reception cycle less than or equal to 0.04 seconds is less than 200 milliseconds, or a measurement parameter corresponding to a discontinuous reception cycle greater than 0.04 seconds and less than or equal to 2.56 seconds is less than five discontinuous reception cycles.

Specifically, the measurement parameter suitable for the high-speed mobile communication environment may be pre-written by a vendor in a production process of the UE, or the measurement parameter suitable for the high-speed mobile communication environment is preset by refreshing or updating a measurement parameter of the produced UE, and is stored in a storage unit.

Specifically, the requirement indication information in this embodiment of the present application may be set in a broadcast data frame. For example, the access network device 30 and each UE reach, by means of negotiation, an agreement that one bit is set between fields to instruct the UE whether to perform measurement reporting according to the preset measurement parameter suitable for the high-speed mobile communication environment. Alternatively, the requirement indication information may be sent to the UE by using RRC dedicated signaling, that is, the RRC dedicated signaling may carry a bit as the requirement indication information, so as to instruct the UE whether to perform measurement reporting according to the preset measurement parameter suitable for the high-speed mobile communication environment. For example, a bit 1 (that is, the requirement indication information) indicates that measurement reporting needs to be performed according to the preset measurement parameter suitable for the high-speed mobile communication environment, and a bit 0 indicates that measurement reporting does not need to be performed according to the preset measurement parameter suitable for the high-speed mobile communication environment. Specifically, for setting of the requirement indication information, refer to the implementations described in the embodiments of Table 2 and Table 4. Details are not described herein again.

That is, the sending module 302 of the access network device 30 may broadcast a data frame in downlink to the UE in the connected state, where the broadcast data frame is provided with the requirement indication information, or send the RRC signaling carrying the requirement indication information to the UE in the connected state, so as to send the requirement indication information to the UE. After receiving the requirement indication information, the UE, in the connected state, located in the high-speed mobile communication environment learns that measurement reporting needs to be performed according to the preset measurement parameter suitable for the high-speed mobile communication environment. Then, the UE uses a shorter measurement period. For example, a measurement period for reference signal received power (RSRP) is shortened from 200 ms to 100 ms, a measurement period for reference signal received quality (RSSQ) is shortened from 200 ms to 100 ms, a measurement parameter that is corresponding to a discontinuous reception cycle less than or equal to 0.04 seconds and that is for RSRP is less than 200 milliseconds, a measurement parameter corresponding to a discontinuous reception cycle greater than 0.04 seconds and less than or equal to 2.56 seconds is less than five discontinuous reception cycles, or the like. Algorithms such as a UE handover algorithm and a cell identification algorithm are all established based on UE measurement. Therefore, processes such as a UE handover process and a cell identification process are all greatly affected by measurement. From system simulation data, shown in Table 6 and provided in this embodiment of the present application, for a handover failure rate and a quantity of radio link failure times in a measurement period application, it may be learned that:

TABLE 6

| Measurement period (milliseconds) | Total quantity of handovers | Quantity of radio link failures | Quantity of ping-pong handovers | Handover failure rate | Quantity of handover failures |
| --- | --- | --- | --- | --- | --- |
| 200 | 7304 | 54 | 175 | 8.00% | 584 |
| 400 | 6906 | 225 | 158 | 15.49% | 1070 |
| 800 | 4171 | 2279 | 0 | 45.26% | 1888 |
| 1600 | 1322 | 4182 | 0 | 66.11% | 874 |

In a high-speed moving state, as a measurement period is prolonged, a UE handover failure rate and a quantity of radio link failures are notably increased. This is because a longer measurement period indicates a more lagged time at which the UE triggers handover, and lagged handover makes the UE be farther away from an original serving cell. Consequently, link quality when the UE sends a measurement report to a serving eNB and the serving eNB delivers a handover command to the UE is deteriorated, and a signaling transfer success rate is directly reduced. As a result, handover performance is reduced, and a handover failure and a radio link failure are caused, and may be specifically presented in a schematic diagram, shown in FIG. 4 and provided in this embodiment of the present application, of handover failure rates in different measurement periods application. Therefore, in this embodiment of the present application, measurement reporting is performed according to the preset measurement parameter suitable for the high-speed mobile communication environment, and the measurement period is shortened, thereby improving handover performance, increasing a handover success rate, reducing a ping-pong effect, and reducing a radio link failure rate.

Furthermore, the processing module 300 in this embodiment of the present application may be further configured to control the sending module 302 to send time period parameter indication information to the UE, where the time period parameter indication information is used to indicate a time period parameter of a T310 timer, and the time period parameter is greater than 2 seconds. That is, the access network device 30 may configure, for the UE, the time period parameter that is of the T310 timer and that is suitable for the high-speed mobile communication environment; the time period parameter that is of the T310 timer and that is suitable for the high-speed mobile communication environment is greater than a time period parameter of the T310 timer in the non-high-speed mobile communication environment.

Specifically, configuration may be performed as follows:

```
        RLF-TimersAndConstants-r9::=      CHOICE {
            release                           NULL,
            setup                             SEQUENCE {
                t301-r9                           ENUMERATED {
                                                      ms100, ms200, ms300, ms400, ms600,
ms1000, ms1500,
                                                      ms2000},
                t310-r9                           ENUMERATED {
                                                      ms0,  ms50,  ms100,  ms200,  ms500,
ms1000, ms2000, ms4000, ms6000, ms8000},
                n310-r9                           ENUMERATED {
                                                      n1, n2, n3, n4, n6, n8, n10, n20},
                t311-r9                           ENUMERATED {
                                                      ms1000,  ms3000,  ms5000,  ms10000,
ms15000,
                                                      ms20000, ms30000},
                n311-r9                           ENUMERATED {
                                                      n1, n2, n3, n4, n5, n6, n8, n10},
                ...
            }
        }
```

A value range that is of a time length of the T310 timer and that is currently stipulated by a protocol (that is, the time period parameter of the T310 timer in the non-high-speed mobile communication environment) is ENUMERATED{ms0, ms50, ms100, ms200, ms500, ms1000, ms2000}, that is, the largest time length is 2 seconds (ms2000). The access network device 30 in this embodiment of the present application configures, for the UE in the connected state, the time period parameter that is of the T310 timer and that is suitable for the high-speed mobile communication environment, and the time period parameter that is of the T310 timer, that is suitable for the high-speed mobile communication environment, and that is newly configured for the UE in the connected state is greater than the time period parameter of the T310 timer in the non-high-speed mobile communication environment, such as 4 seconds, 6 seconds, or 8 seconds, that is, a value range may be ENUMERATED {ms0, ms50, ms100, ms200, ms500, ms1000, ms2000, ms4000, ms6000, ms8000}. In this embodiment of the present application, UE moving at a high speed in a tunnel communication environment application includes UE moving at a high speed in a tunnel, and also includes UE that is moving at a high speed and that is to enter a tunnel. Therefore, after the access network device 30 completes configuration, that is, after the user equipment receives the time period parameter indication information, the UE moving at a high speed in the tunnel communication environment uses, after discovering out-of-synchronization (OoS) by means of monitoring, the time period parameter that is of the T310 timer and that is suitable for the high-speed mobile communication environment, such as 4 seconds, 6 seconds, or 8 seconds, to enable detection of a physical layer problem, and evaluate whether a radio link can be restored.

It may be understood that, in a high-speed railway tunnel scenario, because signal quality in a tunnel is quite poor, radio link failures embodied as a high call drop rate, network interruption, and a quite long restoration time usually occur on the UE. This is because the UE enters a cell selection process after a radio link failure occurs on the UE, but a relatively long time consumed by cell selection plays a large lagging role in restoring a link of the UE. Moreover, dedicated network deployment is used for many high-speed railway scenarios, and a nearby public network is probably selected by means of cell selection after a radio link failure occurs on the UE. In this way, when a train leaves a tunnel and enters a normal communication state, the UE needs to be handed over to a dedicated network again. It may be learned by analyzing actually measured data from an operator that, in a high-speed railway moving state, it is quite difficult for UE to be handed over to a dedicated network from a public network. This is because a train moves at a quite high speed, and the UE leaves an original serving cell (a public network eNB) quite quickly. An Long-Term Evolution (LTE) handover process includes signaling interworking between the UE and the original eNB. As a distance between the UE and the original eNB is quickly increased, quality of a channel between the two becomes quite poor, and it is usually difficult to implement successful signaling interworking. Consequently, the handover fails, and the UE enters a cell selection state again, to form a vicious circle. Actually, a case in which radio link quality in a tunnel is quite poor is usually improved when a train leaves the tunnel, and is not a persistent state. Therefore, in this embodiment of the present application, the time period parameter that is of the T310 timer and that is suitable for the high-speed mobile communication environment is configured for the UE in the connected state, so that the UE may prolong an evaluation time for a radio link failure, and robustness of radio link monitoring in a tunnel may be enhanced to some extent, so as to avoid reselection of a public network after the radio link failure.

It should be further noted that the foregoing embodiments may be combined with each other in any form. For example, embodiments of Table 2 and Table 3 are combined, Table 2 and Table 5 are combined, Table 2, Table 3, and Table 4 are combined, or the like. This is not limited in the present application.

By implementing this embodiment of the present application, the access network device generates the requirement indication information, and sends the requirement indication information to the UE within the coverage of the cell. After receiving the requirement indication information, the UE determines, according to the requirement indication information, that the RRM requirement that is suitable for the high-speed mobile communication environment needs to be satisfied, so as to resolve a prior-art technical problem that UE passes through a target cell but fails to well complete RRM because the UE moves at a quite high speed. The UE can adjust the RRM policy according to the preset RRM parameter suitable for the high-speed mobile communication environment, to shorten an intra-frequency cell reselection time, shorten a target cell identification time, shorten an in-synchronization/out-of-synchronization evaluation time, or shorten a measurement period, so as to satisfy the RRM requirement in the high-speed mobile communication environment, and ensure and improve network performance.

Figure 5:
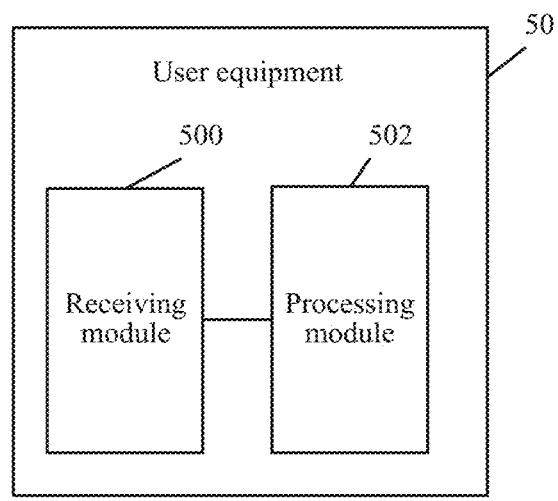
FIG. 5 is a schematic structural diagram of user equipment according to an embodiment of the present application.

The access network device provided in the embodiments of the present application is described in detail above, and a structure of a UE side is correspondingly described below with reference to a schematic structural diagram of user equipment provided in an embodiment of the present application shown in FIG. 5. The user equipment 50 includes a receiving module 500 and a processing module 502.

The receiving module 500 is configured to receive requirement indication information sent by an access network device, where the requirement indication information is used to indicate that the user equipment needs to satisfy a radio resource management RRM requirement that is suitable for a high-speed mobile communication environment.

The processing module 502 is configured to determine, according to the requirement indication information, that the RRM requirement that is suitable for the high-speed mobile communication environment needs to be satisfied.

Specifically, the access network device may send the requirement indication information to the user equipment 50 by means of broadcasting a data frame in downlink to the UE within coverage of a cell of the access network device, that is, the requirement indication information may be set in the broadcast data frame. Alternatively, for the user equipment 50 in a connected state, the access network device may send, by using RRC dedicated signaling, the requirement indication information to the UE within coverage of a cell of the access network device, that is, the requirement indication information may be set in the RRC dedicated signaling. Alternatively, the access network device may directly send the requirement indication information independently to the user equipment 50 by using a network interface. That is, the processing module 502 may parse the requirement indication information from the data frame that is broadcast in downlink, parse the requirement indication information from the RRC dedicated signaling, or directly parse the received requirement indication information, and after it is determined that the RRM requirement that is suitable for the high-speed mobile communication environment needs to be satisfied, may enhance intra-frequency cell reselection, target cell identification, radio link monitoring, measurement reporting, or the like according to performance of the processing module 502, so as to satisfy the RRM requirement that is suitable for the high-speed mobile communication environment.

It may be understood that, for the requirement indication information, the RRM requirement that is suitable for the high-speed mobile communication environment, and a specific implementation in which the access network device sends adjustment indication information to the UE in this embodiment of the present application, refer to the description in the embodiment of the foregoing access network device. Details are not described herein again.

By implementing this embodiment of the present application, the access network device generates the requirement indication information, and sends the requirement indication information to the UE within the coverage of the cell. After receiving the requirement indication information, the UE determines, according to the requirement indication information, that the RRM requirement that is suitable for the high-speed mobile communication environment needs to be satisfied, so as to resolve a prior-art technical problem that UE passes through a target cell but fails to well complete RRM because the UE moves at a quite high speed. The UE can adjust an RRM policy according to a preset RRM parameter suitable for the high-speed mobile communication environment, to shorten an intra-frequency cell reselection time, shorten a target cell identification time, shorten an in-synchronization/out-of-synchronization evaluation time, or shorten a measurement period, so as to satisfy the RRM requirement in the high-speed mobile communication environment, and ensure and improve network performance.

Further, the processing module 502 may be further configured to adjust an RRM policy according to a preset RRM parameter suitable for the high-speed mobile communication environment.

Specifically, the receiving module 500 of the user equipment 50 receives the requirement indication information, and after parsing the requirement indication information, the processing module 502 may directly adjust the RRM policy according to the preset RRM parameter suitable for the high-speed mobile communication environment, so as to satisfy the RRM requirement that is suitable for the high-speed mobile communication environment.

Alternatively, the processing module 502 may first perform determining according to the requirement indication information, so as to determine whether current performance of the processing module 502 can support the RRM requirement that is suitable for the high-speed mobile communication environment, and the processing module 502 adjusts the RRM policy according to the preset RRM parameter suitable for the high-speed mobile communication environment only if the current performance of the processing module 502 cannot support the RRM requirement that is suitable for the high-speed mobile communication environment, so as to satisfy the RRM requirement that is suitable for the high-speed mobile communication environment.

For example, the requirement indication information sent by the access network device may include speed level information, and the speed level information is used to indicate a speed level of the high-speed mobile communication environment. The speed level information may be specifically speed range information, that is, the access network device and the user equipment 50 determine a plurality of speed ranges by means of pre-negotiation. Specifically, correspondingly refer to the description in the embodiment of the foregoing access network device. Details are not described herein again. After the receiving module 500 of the user equipment 50 receives the speed level information, the processing module 502 specifically determines, according to the speed level information and the performance of the processing module 502, whether the RRM requirement that is suitable for the high-speed mobile communication environment can be satisfied. For example, if the user equipment 50 has relatively high performance, and although a current moving speed is relatively high, the UE can still support an RRM requirement in a current moving speed environment, the user equipment 50 determines that the RRM requirement that is suitable for the high-speed mobile communication environment can be satisfied currently. If the user equipment 50 cannot support the RRM requirement in the current moving speed environment, the user equipment 50 determines that the RRM requirement that is suitable for the high-speed mobile communication environment cannot be satisfied currently, and the user equipment 50 needs to adjust the RRM policy according to the preset RRM parameter suitable for the high-speed mobile communication environment, so as to satisfy the RRM requirement that is suitable for the high-speed mobile communication environment.

ment capability information, the access network device sends the requirement indication information to the user equipment.

Specifically, the sending module 504 may report the high-speed adjustment capability information to the access network device by using RRC dedicated signaling of a network, for example, by adding an IE:

```
HSTRRM-capability          BOOLEAN           OPTIONAL, where
the IE may be placed in UEInformationResponse of the RRC dedicated signaling:
UEInformationResponse-r9 ::=     SEQUENCE {
   rrc-TransactionIdentifier     RRC-TransactionIdentifier,
   criticalExtensions            CHOICE {
      c1                              CHOICE {
         ueInformationResponse-r9             UEInformationResponse-r9-IEs,
         spare3 NULL, spare2 NULL, spare1 NULL
      },
      criticalExtensionsFuture        SEQUENCE { }
HSTRRM-capability          BOOLEAN           OPTIONAL,
```

For another example, the requirement indication information sent by the access network device may include range information of a high-speed dedicated cell identifier, and the range information of the high-speed dedicated cell identifier is used to indicate the cell located in the high-speed mobile communication environment. When the UE enters the cell coverage of the access network device, for example, the UE in an idle state camps on the cell coverage of the access network device by means of cell selection or cell reselection, or the UE in the connected state accesses the cell coverage of the access network device by means of handover or RRC reconstruction, the UE is informed, by using the range information of the high-speed dedicated cell identifier, of cells that belong to high-speed dedicated cells. Specifically, correspondingly refer to the description in the embodiment of the foregoing access network device. Details are not described herein again. After the receiving module 500 of the user equipment 50 receives the range information of the high-speed dedicated cell identifier, the processing module 502 determines whether a cell identifier of a currently accessed cell falls within a range (PhysCellIdRange) of the high-speed dedicated cell identifier, and if not, determines that the cell identifier of the currently accessed cell does not fall within the range of the high-speed dedicated cell identifier, and determines that the RRM requirement that is suitable for the high-speed mobile communication environment does not need to be satisfied: otherwise, determines that the cell identifier of the currently accessed cell falls within the range of the high-speed dedicated cell identifier, that is, determines that the RRM policy needs to be adjusted according to the preset RRM parameter suitable for the high-speed mobile communication environment, so as to satisfy the RRM requirement that is suitable for the high-speed mobile communication environment.

Figure 6:
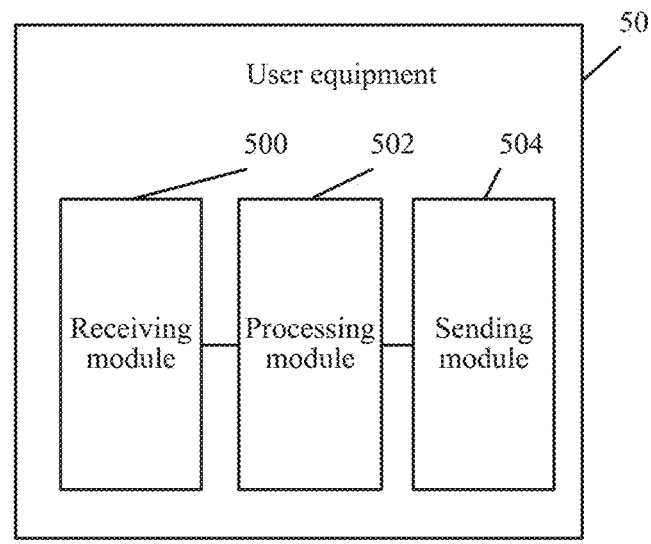
FIG. 6 is a schematic structural diagram of another embodiment of user equipment according to the present application.

Furthermore, FIG. 6 shows a schematic structural diagram of another embodiment of user equipment according to the present application. In addition to including a receiving module 500 and a processing module 502, the user equipment 50 may further include a sending module 504, configured to report high-speed adjustment capability information to the access network device, where the high-speed adjustment capability information is used to indicate that the UE has a capability of supporting the RRM requirement that is suitable for the high-speed mobile communication environment. Therefore, after receiving the high-speed adjust- The access network device sends adjustment indication information to the user equipment 50 only after receiving the high-speed adjustment capability information reported by the user equipment 50. Specifically, correspondingly refer to the description in the embodiment of the foregoing access network device. Details are not described herein again.

Further, when the access network device pre-configures, for the UE, at least one discontinuous reception cycle suitable for the high-speed mobile communication environment, the discontinuous reception cycle suitable for the high-speed mobile communication environment is less than 0.32 seconds. That is, the receiving module 500 is further configured to receive discontinuous reception cycle indication information from the access network device, where the discontinuous reception cycle indication information is used to indicate a discontinuous reception cycle, and the discontinuous reception cycle is less than 0.32 seconds: and the processing module 502 is further configured to perform intra-frequency cell reselection according to the discontinuous reception cycle when the user equipment 50 is in an idle state.

Specifically, refer to the implementation about how the UE performs intra-frequency cell reselection according to the discontinuous reception cycle that is suitable for the high-speed mobile communication environment and that is indicated by the requirement indication information in the embodiment of Table 1. Details are not described herein again.

Furthermore, the processing module 502 may be further configured to perform intra-frequency cell reselection according to preset evaluation time parameters of a cell reselection process when the user equipment 50 is in the idle state, where among the evaluation time parameters of the cell reselection process, an evaluation time parameter corresponding to a discontinuous reception cycle of 2.56 seconds is less than 7.68 seconds, an evaluation time parameter corresponding to a discontinuous reception cycle of 1.28 seconds is less than 6.4 seconds, an evaluation time parameter corresponding to a discontinuous reception cycle of 0.64 seconds is less than 5.12 seconds, or an evaluation time parameter corresponding to a discontinuous reception cycle of 0.32 seconds is less than 5.12 seconds.

Specifically, refer to the implementation about how the UE performs intra-frequency cell reselection according to the requirement indication information by using the evaluation time parameter that is of the cell reselection process and that is suitable for the high-speed mobile communication environment in the embodiment of Table 2. Details are not described herein again.

Furthermore, the processing module 502 may be further configured to perform intra-frequency cell reselection according to a preset identification time parameter of the cell reselection process when the user equipment 50 is in the idle state, where the identification time parameter of the cell reselection process is less than 20 discontinuous reception cycles.

Specifically, refer to the implementation about how the UE performs intra-frequency cell reselection according to the requirement indication information by using the identification time parameter that is of the cell reselection process and that is suitable for the high-speed mobile communication environment in the embodiment of Table 3. Details are not described herein again.

Furthermore, the processing module 502 may be further configured to perform target cell identification according to preset target cell identification time parameters when the user equipment 50 is in a connected state, where among the target cell identification time parameters, a target cell identification time parameter corresponding to a discontinuous reception cycle of 0.04 seconds is less than 0.8 seconds, a target cell identification time parameter corresponding to a discontinuous reception cycle greater than 0.04 seconds and not exceeding 0.08 seconds is less than 40 discontinuous reception cycles, a target cell identification time parameter corresponding to a discontinuous reception cycle of 0.128 seconds is less than 25 discontinuous reception cycles, or a target cell identification time parameter corresponding to a discontinuous reception cycle greater than 0.128 seconds and not exceeding 2.56 seconds is less than 20 discontinuous reception cycles.

Specifically, refer to the implementation about how the UE performs target cell identification according to the requirement indication information by using the target cell identification time parameter suitable for the high-speed mobile communication environment in the embodiment of Table 4. Details are not described herein again.

Furthermore, the processing module 502 may be further configured to perform radio link monitoring according to preset in-synchronization/out-of-synchronization evaluation period parameters when the user equipment 50 is in the connected state, where among the in-synchronization/out-of-synchronization evaluation period parameters, an in-synchronization/out-of-synchronization evaluation period parameter corresponding to a discontinuous reception cycle greater than 0.01 second and not exceeding 0.04 seconds is less than 20 discontinuous reception cycles, an in-synchronization/out-of-synchronization evaluation period parameter corresponding to a discontinuous reception cycle greater than 0.04 seconds and not exceeding 0.64 seconds is less than 10 discontinuous reception cycles, or an in-synchronization/out-of-synchronization evaluation period parameter corresponding to a discontinuous reception cycle greater than 0.64 seconds and not exceeding 2.56 seconds is less than five discontinuous reception cycles.

Specifically, refer to the implementation about how the UE performs radio link monitoring according to the requirement indication information by using the in-synchronization/out-of-synchronization evaluation period parameter suitable for the high-speed mobile communication environment in the embodiment of Table 5. Details are not described herein again.

Furthermore, the processing module 502 may be further configured to perform measurement reporting according to a preset measurement parameter when the user equipment 50 is in the connected state, where the measurement parameter is less than 200 milliseconds, a measurement parameter corresponding to a discontinuous reception cycle less than or equal to 0.04 seconds is less than 200 milliseconds, or a measurement parameter corresponding to a discontinuous reception cycle greater than 0.04 seconds and less than or equal to 2.56 seconds is less than five discontinuous reception cycles.

Specifically, refer to the implementation about how the UE performs measurement reporting according to the requirement indication information by using the measurement parameter suitable for the high-speed mobile communication environment in the embodiment of Table 6. Details are not described herein again.

Furthermore, the receiving module 500 may be further configured to receive time period parameter indication information from the access network device, where the time period parameter indication information is used to indicate a time period parameter of a T310 timer, and the time period parameter is greater than 2 seconds.

The processing module 502 may be further configured to: when the user equipment 50 is in a connected state in a tunnel communication environment, enable detection of a physical layer problem by using the time period parameter of the T310 timer.

Specifically, refer to the implementation about how the UE enables detection of the physical layer problem by using the time period parameter that is of the T310 timer and that is suitable for the high-speed mobile communication environment in the embodiment of the foregoing access network device 30. Details are not described herein again.

It should be noted that the foregoing embodiments may be combined with each other in any form. This is not limited in the present application.

By implementing this embodiment of the present application, the access network device generates the requirement indication information, and sends the requirement indication information to the UE within the coverage of the cell. After receiving the requirement indication information, the UE determines, according to the requirement indication information, that the RRM requirement that is suitable for the high-speed mobile communication environment needs to be satisfied, so as to resolve a prior-art technical problem that UE passes through a target cell but fails to well complete RRM because the UE moves at a quite high speed. The UE can adjust an RRM policy according to a preset RRM parameter suitable for the high-speed mobile communication environment, to shorten an intra-frequency cell reselection time, shorten a target cell identification time, shorten an in-synchronization/out-of-synchronization evaluation time, or shorten a measurement period, so as to satisfy the RRM requirement in the high-speed mobile communication environment, and ensure and improve network performance.

Figure 7:
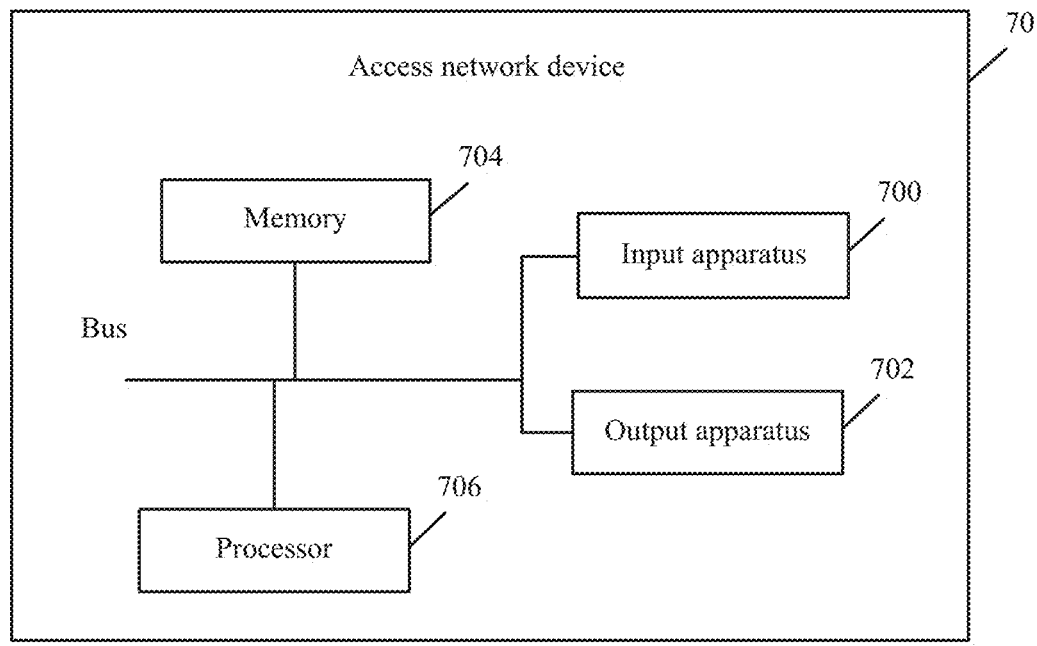
FIG. 7 is a schematic structural diagram of another embodiment of an access network device according to the present application.

With reference to a schematic structural diagram, shown in FIG. 7, of another embodiment of an access network device according to the present application, the access network device 70 includes an input apparatus 700, an output apparatus 702, a memory 704, and a processor 706 (there may be one or more processors 706 in the access network device 70, and one processor is used as an example in FIG. 7). In some embodiments of the present application, the input apparatus 700, the output apparatus 702, the memory 704, and the processor 706 may be connected by using a bus or in another manner. In FIG. 7, an example in which connection is implemented by using a bus is used.

Specifically, for specific functions and execution steps of the processor 706, refer to the implementation of the processing module 300 in the foregoing access network device 30, for specific functions and execution steps of the output apparatus 702, refer to the implementation of the sending module 302 in the foregoing access network device 30, and for specific functions and execution steps of the input apparatus 700, refer to the implementation of the receiving module in the foregoing access network device 30. Details are not described herein again.

Figure 8:
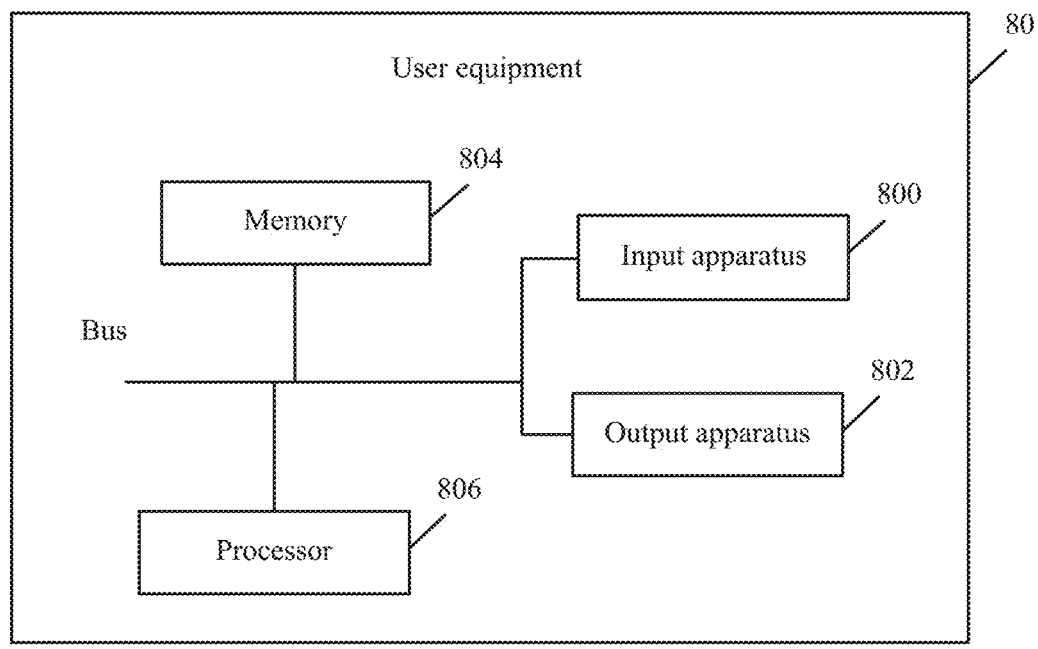
FIG. 8 is a schematic structural diagram of another embodiment of user equipment according to the present application.

With reference to a schematic structural diagram, shown in FIG. 8, of another embodiment of user equipment according to the present application, the user equipment 80 includes an input apparatus 800, an output apparatus 802, a memory 804, and a processor 806 (there may be one or more processors 806 in the user equipment 80, and one processor is used as an example in FIG. 8). In some embodiments of the present application, the input apparatus 800, the output apparatus 802, the memory 804, and the processor 806 may be connected by using a bus or in another manner. In FIG. 8, an example in which connection is implemented by using a bus is used.

Specifically, for specific functions and execution steps of the processor 806, refer to the implementation of the processing module 502 in the foregoing user equipment 50, for specific functions and execution steps of the output apparatus 802, refer to the implementation of the sending module 504 in the foregoing user equipment 50, and for specific functions and execution steps of the input apparatus 800, refer to the implementation of the receiving module 500 in the foregoing user equipment 50. Details are not described herein again.

Figure 9:
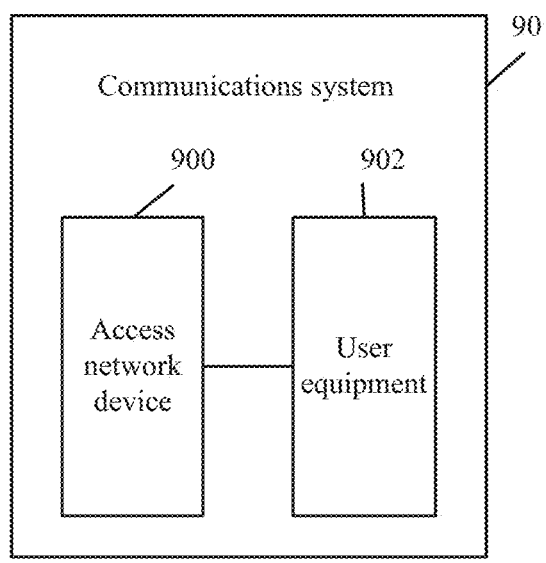
FIG. 9 is a schematic structural diagram of a communications system according to an embodiment of the present application.

With reference to a schematic structural diagram, shown in FIG. 9, of a communications system according to an embodiment of the present application, the communications system 90 includes at least one access network device 900 and at least one user equipment 902, and in FIG. 9, an example in which the communications system 90 includes one access network device 900 and one user equipment 902 is used for description. As shown in the application scenario in FIG. 2, a user carries the user equipment 902 and takes a high-speed moving vehicle such as a high speed train, and the user equipment 902 communicates with another user equipment by means of connecting to and interacting with the access network device 900.

The access network device 900 generates requirement indication information, where the requirement indication information is used to indicate that the user equipment 902 needs to satisfy a radio resource management RRM requirement that is suitable for a high-speed mobile communication environment: and sends the requirement indication information to the user equipment 902 within coverage of a cell, so that the user equipment 902 learns that the RRM requirement that is suitable for the high-speed mobile communication environment needs to be supported.

The user equipment 902 receives the requirement indication information sent by the access network device 900: and determines, according to the requirement indication information, that the RRM requirement that is suitable for the high-speed mobile communication environment needs to be satisfied.

Specifically, a structure and a function of the access network device 900 may be specifically implemented according to the description in the embodiment of the access network device 30 or the access network device 70. Details are not described herein again. A structure and a function of the user equipment 902 may be specifically implemented according to the description in the embodiment of the user equipment 50 or the user equipment 80. Details are not described herein again.

Figure 10:
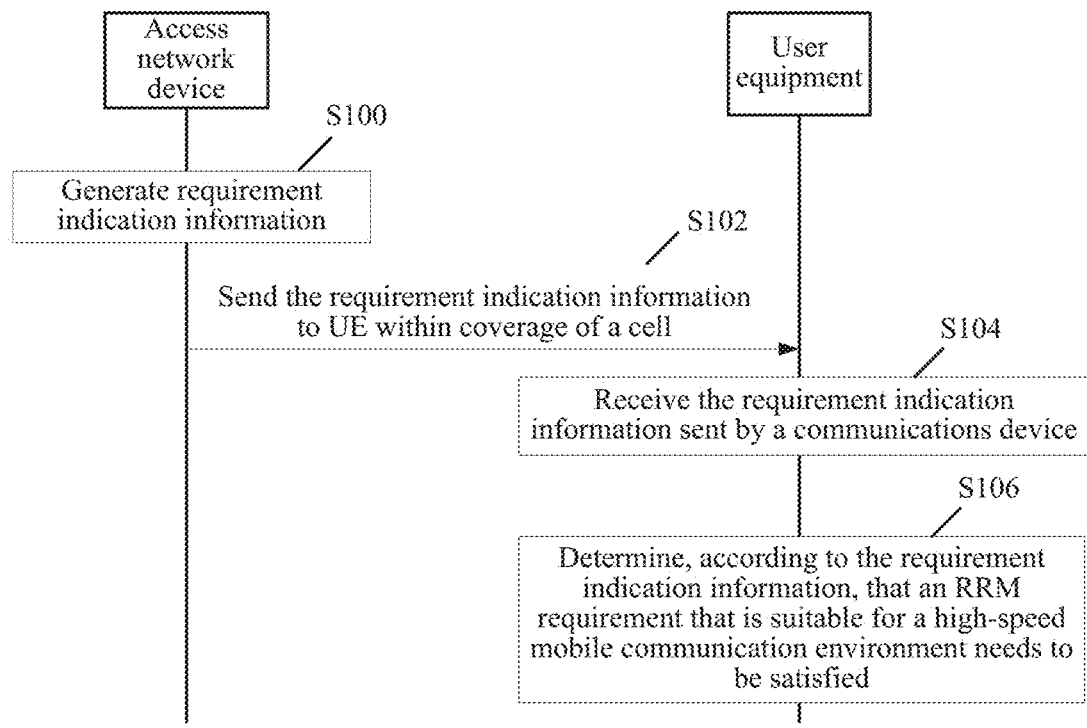
FIG. 10 is a schematic flowchart of a communication method according to an embodiment of the present application.

Correspondingly, FIG. 10 is a schematic flowchart of a communication method according to an embodiment of the present application. For same content, refer to the description in the foregoing embodiment. Details are not described herein again. The method includes the following steps.

Step S100: An access network device generates requirement indication information.

Specifically, the requirement indication information is used to indicate that user equipment UE needs to satisfy a radio resource management RRM requirement that is suitable for a high-speed mobile communication environment. For details of the requirement indication information, refer to the related description in the embodiment of the foregoing access network device 30. Details are not described herein again.

Step S102: The access network device sends the requirement indication information to UE within coverage of a cell.

Specifically, the access network device may send radio resource control RRC dedicated signaling to the UE within the coverage of the cell, where the RRC dedicated signaling carries the requirement indication information: or send a system message to the UE within the coverage of the cell, where the system message carries the requirement indication information. Specifically, refer to the related description in the embodiment of the foregoing access network device 30. Details are not described herein again.

Step S104: The user equipment receives the requirement indication information sent by the access network device.

Step S106: Determine, according to the requirement indication information, that an RRM requirement that is suitable for a high-speed mobile communication environment needs to be satisfied.

Specifically, after receiving the requirement indication information, the user equipment learns that the RRM requirement that is suitable for the high-speed mobile communication environment needs to be satisfied, and may enhance intra-frequency cell reselection, target cell identification, radio link monitoring, measurement reporting, or the like according to performance of the user equipment, so as to satisfy the RRM requirement that is suitable for the high-speed mobile communication environment.

Optionally, before step S100 of sending the requirement indication information to UE within coverage of a cell, the method may further include: reporting, by the user equipment, high-speed adjustment capability information to the access network device, so as to indicate that the UE has a capability of supporting the RRM requirement that is suitable for the high-speed mobile communication environment. After the access network device receives the high-speed adjustment capability information reported by the UE within the coverage of the cell, step S100 of sending the requirement indication information to UE within coverage of a cell may specifically include: sending, according to the received high-speed adjustment capability information, the requirement indication information to the UE that has a high-speed adjustment capability.

Further, after receiving the requirement indication information, the UE may directly adjust an RRM policy according to a preset RRM parameter suitable for the high-speed mobile communication environment, so as to satisfy the RRM requirement that is suitable for the high-speed mobile communication environment. Alternatively, the UE may first perform determining according to the requirement indication information, so as to determine whether current performance of the UE can satisfy the RRM requirement that is suitable for the high-speed mobile communication environment, and the UE adjusts an RRM policy according to a preset RRM parameter suitable for the high-speed mobile communication environment only if the current performance of the UE cannot satisfy the RRM requirement that is suitable for the high-speed mobile communication environment, so as to satisfy the RRM requirement that is suitable for the high-speed mobile communication environment.

Figure 11:
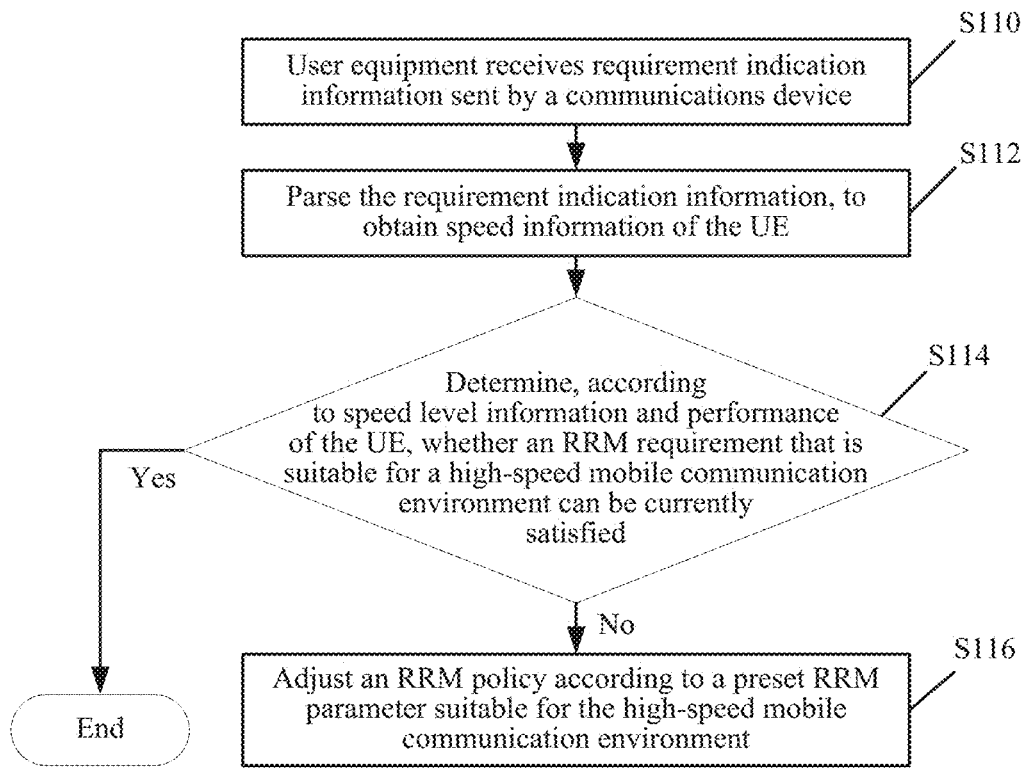
FIG. 11 is a schematic flowchart of another embodiment of a communication method according to the present application.

For example, the requirement indication information may include speed level information. A schematic flowchart, shown in FIG. 11, of another embodiment of a communication method according to the present application specifically describes how UE determines, according to the requirement indication information, whether an RRM requirement that is suitable for a high-speed mobile communication environment can be satisfied. The method includes the following steps.

Step S110: The user equipment receives the requirement indication information sent by an access network device.

Step S112: Parse the requirement indication information, to obtain the speed level information.

Step S114: Determine, according to the speed level information and performance of the user equipment, whether the RRM requirement that is suitable for the high-speed mobile communication environment can be currently satisfied.

Specifically, for the speed level information, refer to the description in the embodiment of the foregoing access network device 30. Details are not described herein again. The UE needs to determine, according to the speed level information, that the RRM requirement that is suitable for the high-speed mobile communication environment is satisfied. Specifically, if the UE has relatively high performance, and although a current moving speed is relatively high, the UE can still support an RRM requirement in a current moving speed environment, the UE determines that the RRM requirement that is suitable for the high-speed mobile communication environment can be currently satisfied, and then may end the adjustment process, and continue to communicate according to a current state. If the UE cannot support the RRM requirement in the current moving speed environment, the UE determines that the RRM requirement that is suitable for the high-speed mobile communication environment cannot be currently satisfied, and performs step S116.

Step S116: Adjust an RRM policy according to a preset RRM parameter suitable for the high-speed mobile communication environment.

Figure 12:
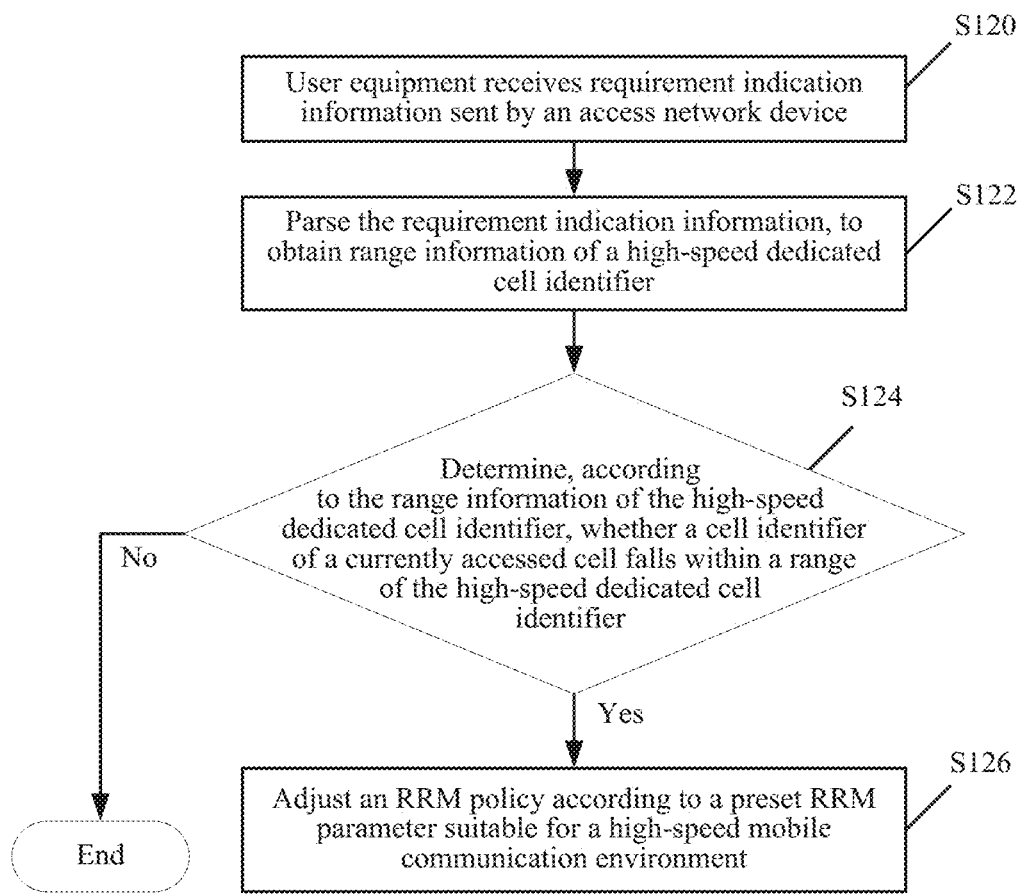
FIG. 12 is a schematic flowchart of another embodiment of a communication method according to the present application.

For another example, the requirement indication information includes range information of a high-speed dedicated cell identifier. A schematic flowchart, shown in FIG. 12, of another embodiment of a communication method according to the present application specifically describes how UE determines, according to the requirement indication information, whether an RRM requirement that is suitable for a high-speed mobile communication environment can be satisfied. The method includes the following steps.

Step S120: The user equipment receives the requirement indication information sent by an access network device.

Step S122: Parse the requirement indication information, to obtain the range information of the high-speed dedicated cell identifier.

Step S124: Determine, according to the range information of the high-speed dedicated cell identifier, whether a cell identifier of a currently accessed cell falls within a range of the high-speed dedicated cell identifier.

Specifically, for related description of the range information of the high-speed dedicated cell identifier, refer to the implementation in the embodiment of the foregoing access network device 30. Details are not described herein again. If the UE determines that the cell identifier of the currently accessed cell does not fall within the range of the high-speed dedicated cell identifier, it indicates that the UE is not in the high-speed mobile communication environment, and then the UE may end the adjustment process, and continue to communicate according to a normal state; otherwise, if the UE determines that the cell identifier of the currently accessed cell falls within the range of the high-speed dedicated cell identifier, it indicates that the UE is in the high-speed mobile communication environment, and then the UE determines that the RRM requirement that is suitable for the high-speed mobile communication environment needs to be satisfied, and performs step S126.

Step S126: Adjust an RRM policy according to a preset RRM parameter suitable for the high-speed mobile communication environment.

Furthermore, when the UE needs, after the UE learns that the RRM requirement that is suitable for the high-speed mobile communication environment needs to be satisfied, to adjust the RRM policy according to the preset RRM parameter suitable for the high-speed mobile communication environment, so as to satisfy the RRM requirement that is suitable for the high-speed mobile communication environment, how to specifically perform adjustment is described by using an example:

1. The user equipment receives discontinuous reception cycle indication information from the access network device, where the discontinuous reception cycle indication information is used to indicate a discontinuous reception cycle, and the discontinuous reception cycle is less than 0.32 seconds. That is, when the access network device 30 preconfigures, for the UE, at least one discontinuous reception cycle suitable for the high-speed mobile communication environment, where the discontinuous reception cycle suitable for the high-speed mobile communication environment is less than 0.32 seconds, after receiving the requirement indication information, the UE in an idle state may perform intra-frequency cell reselection according to the configured discontinuous reception cycle suitable for the high-speed mobile communication environment, so as to shorten an intra-frequency cell reselection time.

2. Intra-frequency cell reselection may be performed according to preset evaluation time parameters of a cell reselection process when the user equipment is in the idle state, where among the evaluation time parameters of the cell reselection process, an evaluation time parameter corresponding to a discontinuous reception cycle of 2.56 seconds is less than 7.68 seconds, an evaluation time parameter corresponding to a discontinuous reception cycle of 1.28 seconds is less than 6.4 seconds, an evaluation time parameter corresponding to a discontinuous reception cycle of 0.64 seconds is less than 5.12 seconds, or an evaluation time parameter corresponding to a discontinuous reception cycle of 0.32 seconds is less than 5.12 seconds.

3. Intra-frequency cell reselection may be performed according to a preset identification time parameter of the cell reselection process when the user equipment is in the idle state, where the identification time parameter of the cell reselection process is less than 20 discontinuous reception cycles.

4. Target cell identification may be performed according to preset target cell identification time parameters when the user equipment is in a connected state, where among the target cell identification time parameters, a target cell identification time parameter corresponding to a discontinuous reception cycle of 0.04 seconds is less than 0.8 seconds, a target cell identification time parameter corresponding to a discontinuous reception cycle greater than 0.04 seconds and not exceeding 0.08 seconds is less than 40 discontinuous reception cycles, a target cell identification time parameter corresponding to a discontinuous reception cycle of 0.128 seconds is less than 25 discontinuous reception cycles, or a target cell identification time parameter corresponding to a discontinuous reception cycle greater than 0.128 seconds and not exceeding 2.56 seconds is less than 20 discontinuous reception cycles.

5. Radio link monitoring may be performed according to preset in-synchronization/out-of-synchronization evaluation period parameters when the user equipment is in the connected state, where among the in-synchronization/out-of-synchronization evaluation period parameters, an in-synchronization/out-of-synchronization evaluation period parameter corresponding to a discontinuous reception cycle greater than 0.01 second and not exceeding 0.04 seconds is less than 20 discontinuous reception cycles, an in-synchronization/out-of-synchronization evaluation period parameter corresponding to a discontinuous reception cycle greater than 0.04 seconds and not exceeding 0.64 seconds is less than 10 discontinuous reception cycles, or an in-synchronization/out-of-synchronization evaluation period parameter corresponding to a discontinuous reception cycle greater than 0.64 seconds and not exceeding 2.56 seconds is less than five discontinuous reception cycles.

6. Measurement reporting may be performed according to a preset measurement parameter when the user equipment is in the connected state, where the measurement parameter is less than 200 milliseconds, a measurement parameter corresponding to a discontinuous reception cycle less than or equal to 0.04 seconds is less than 200 milliseconds, or a measurement parameter corresponding to a discontinuous reception cycle greater than 0.04 seconds and less than or equal to 2.56 seconds is less than five discontinuous reception cycles.

7. The user equipment receives time period parameter indication information from the access network device, where the time period parameter indication information is used to indicate a time period parameter of a T310 timer, and the time period parameter is greater than 2 seconds. That is, when the access network device pre-configures, for the UE, the time period parameter that is of the T310 timer and that is suitable for the high-speed mobile communication environment, where the time period parameter that is of the T310 timer and that is suitable for the high-speed mobile communication environment is greater than a time period parameter of the T310 timer in a non-high-speed mobile communication environment, the UE in the connected state in a tunnel communication environment may enable detection of a physical layer problem by using the time period parameter that is of the T310 timer and that is suitable for the high-speed mobile communication environment, so as to prolong a time length of monitoring on whether a radio link is restored.

It should be noted that, for specific implementations of the foregoing method embodiments, correspondingly refer to the descriptions of the embodiments of the access network device and the user equipment. Details are not described herein again.

By implementing the embodiments of the present application, the access network device generates the requirement indication information, and sends the requirement indication information to the UE within the coverage of the cell, and after receiving the requirement indication information, the UE determines, according to the requirement indication information, that the RRM requirement that is suitable for the high-speed mobile communication environment needs to be satisfied, so as to resolve a prior-art technical problem that UE passes through a target cell but fails to well complete RRM because the UE moves at a quite high speed. The UE can adjust the RRM policy according to the preset RRM parameter suitable for the high-speed mobile communication environment, to shorten an intra-frequency cell reselection time, shorten a target cell identification time, shorten an in-synchronization/out-of-synchronization evaluation time, or shorten a measurement period, so as to satisfy the RRM requirement in the high-speed mobile communication environment, and ensure and improve network performance.

What is claimed is:

1. An access network device, comprising:
at least one processor, the at least one processor configured to generate requirement indication information, wherein the requirement indication information indicates that a communication device needs to satisfy a radio resource management (RRM) requirement, and wherein the RRM requirement is suitable for a high-speed mobile communication environment; and
a transmitter, the transmitter configured to transmit the requirement indication information to the communication device within coverage of a cell; and
wherein the RRM requirement corresponds to at least one of RRM parameters, wherein the RRM parameters include a target cell identification time parameter in a connected state used to perform target cell identification, and wherein the target cell identification time parameter in a connected state corresponding to a discontinuous reception cycle greater than 0.04 seconds and not exceeding 0.08 seconds is less than or equal to 15 discontinuous reception cycles, or the target cell identification time parameter in a connected state corresponding to a discontinuous reception cycle of 0.128 seconds is less than 20 discontinuous reception cycles.

2. The access network device according to claim 1, wherein in transmitting the requirement indication information to the communication device within coverage of a cell, the transmitter is configured to:
transmit radio resource control (RRC) dedicated signaling to the communication device within the coverage of the cell, wherein the RRC dedicated signaling carries the requirement indication information; or
transmit a system message to the communication device within the coverage of the cell, wherein the system message carries the requirement indication information.

3. The access network device according to claim 1, further comprising:
a receiver, the receiver configured to receive high-speed adjustment capability information from the communication device, wherein:
the at least one processor is further configured to determine, according to the high-speed adjustment capability information, that the communication device has a capability of supporting the RRM requirement, and control the transmitter to transmit the requirement indication information to the communication device.

4. The access network device according to claim 1, wherein the RRM parameters further include a measurement parameter in a connected state used to perform measurement reporting, and wherein the measurement parameter is less than 200 milliseconds, the measurement parameter corresponding to a discontinuous reception cycle less than or equal to 0.04 seconds is less than 200 milliseconds, or the measurement parameter corresponding to a discontinuous reception cycle greater than 0.04 seconds and less than 2.56 seconds is less than five discontinuous reception cycles.

5. A communication device, wherein the communication device is a user equipment (UE), comprising:
  a receiver, the receiver configured to receive requirement indication information from an access network device, wherein the requirement indication information indicates that the communication device needs to satisfy a radio resource management (RRM) requirement, and wherein the RRM requirement is suitable for a high-speed mobile communication environment; and
  at least one processor, the at least one processor configured to:
   determine, according to the requirement indication information, that the RRM requirement needs to be satisfied; and
   adjust an RRM policy according to at least one of preset RRM parameters suitable for the high-speed mobile communication environment, wherein the RRM parameters include a target cell identification time parameter, wherein the at least one processor is configured to perform target cell identification according to the target cell identification time parameter when the communication device is in a connected state; and
  wherein the target cell identification time parameter corresponding to a discontinuous reception cycle greater than 0.04 seconds and not exceeding 0.08 seconds is less than or equal to 15 discontinuous reception cycles, or the target cell identification time parameter corresponding to a discontinuous reception cycle of 0.128 seconds is less than 20 discontinuous reception cycles.

6. The communication device according to claim 5, further comprising:
  a transmitter, the transmitter configured to transmit high-speed adjustment capability information to the access network device, wherein the high-speed adjustment capability information indicates that the communication device has a capability of supporting the RRM requirement.

7. The communication device according to claim 5, wherein in adjusting the RRM policy according to at least one of the preset RRM parameters suitable for the high-speed mobile communication environment, the RRM parameters further include a measurement parameter in a connected state, and the at least one processor is configured to perform measurement reporting according to a preset measurement parameter when the communication device is in a connected state, wherein the measurement parameter is less than 200 milliseconds, the measurement parameter corresponding to a discontinuous reception cycle less than or equal to 0.04 seconds is less than 200 milliseconds, or the measurement parameter corresponding to a discontinuous reception cycle greater than 0.04 seconds and less than 2.56 seconds is less than five discontinuous reception cycles.

8. A communication method performed by an access device, comprising:
  generating requirement indication information, wherein the requirement indication information is used to indicate that a communication device needs to satisfy a radio resource management (RRM) requirement, wherein the RRM requirement is suitable for a high-speed mobile communication environment; and
  sending the requirement indication information to the communication device; and
  wherein the RRM requirement corresponds to at least one of RRM parameters, wherein the RRM parameters include a target cell identification time parameter in a connected state used to perform target cell identification, and wherein the target cell identification time parameter in a connected state corresponding to a discontinuous reception cycle greater than 0.04 seconds and not exceeding 0.08 seconds is less than or equal to 15 discontinuous reception cycles, or the target cell identification time parameter in a connected state corresponding to a discontinuous reception cycle of 0.128 seconds is less than 20 discontinuous reception cycles.

9. The method according to claim 8, wherein before the sending the requirement indication information to the communication device, the method further comprises:
  receiving high-speed adjustment capability information from the communication device; and
  the sending the requirement indication information to the communication device comprises:
   determining, according to the high-speed adjustment capability information, that the communication device has a capability of supporting the RRM requirement; and
   sending the requirement indication information to the communication device.

10. The method according to claim 8, wherein the sending the requirement indication information to the communication device comprises:
  sending radio resource control (RRC) dedicated signaling to the communication device, wherein the RRC dedicated signaling carries the requirement indication information; or
  sending a system message to the communication device, wherein the system message carries the requirement indication information.

11. The method according to claim 8, wherein the RRM parameters further include a measurement parameter in a connected state used to perform measurement reporting, and wherein the measurement parameter is less than 200 milliseconds, the measurement parameter corresponding to a discontinuous reception cycle less than or equal to 0.04 seconds is less than 200 milliseconds, or the measurement parameter corresponding to a discontinuous reception cycle greater than 0.04 seconds and less than 2.56 seconds is less than five discontinuous reception cycles.

12. A communication method performed by a communication device, wherein the communication device is a user equipment (UE), comprising:
  receiving requirement indication information from an access network device, wherein the requirement indication information indicates that the communication device needs to satisfy a radio resource management (RRM) requirement, and wherein the RRM requirement is suitable for a high-speed mobile communication environment; and
  determining, according to the requirement indication information, that the RRM requirement that needs to be satisfied; and
  adjusting an RRM policy according to at least one of preset RRM parameters suitable for the high-speed mobile communication environment, wherein the RRM parameters include a target cell identification time parameter a measurement parameter, and wherein adjusting the RRM policy comprises performing target cell identification according to the target cell identification time parameter when the communication device is in a connected state; and wherein the target cell identification time parameter corresponding to a discontinuous reception cycle greater than 0.04 seconds and not exceeding 0.08 seconds is less than or equal to 15 discontinuous reception cycles, or the target cell identification time parameter corresponding to a discontinuous reception cycle of 0.128 seconds is less than 20 discontinuous reception cycles.

13. The method according to claim 12, wherein before the receiving requirement indication information from an access network device, the method further comprises:

reporting high-speed adjustment capability information to the access network device, wherein the high-speed adjustment capability information is used to indicate that the communication device has a capability of supporting the RRM requirement.

14. The method according to claim 12, wherein the RRM parameters further include a measurement parameter, and wherein the adjusting an RRM policy according to at least one of preset RRM parameters suitable for the high-speed mobile communication environment comprises:

performing measurement reporting according to a preset measurement parameter when the communication device is in a connected state, wherein the measurement parameter is less than 200 milliseconds, the measurement parameter corresponding to a discontinuous reception cycle less than or equal to 0.04 seconds is less than 200 milliseconds, or the measurement parameter corresponding to a discontinuous reception cycle greater than 0.04 seconds and less than 2.56 seconds is less than five discontinuous reception cycles.

* * * * *